US012714023B2

(12) United States Patent
Zielke et al.

(10) Patent No.: US 12,714,023 B2
(45) Date of Patent: Aug. 25, 2026

(54) CROSS TRACK ERROR SENSOR AND RELATED DEVICES, SYSTEMS, AND METHODS

(71) Applicant: Ag Leader Technology, Ames, IA (US)

(72) Inventors: Roger Zielke, Huxley, IA (US); Scott Eichhorn, Ames, IA (US)

(73) Assignee: Ag Leader Technology, Ames, IA (US)

( * ) Notice: Subject to any disclaimer, the term of this patent is extended or adjusted under 35 U.S.C. 154(b) by 166 days.

(21) Appl. No.: 18/116,714

(22) Filed: Mar. 2, 2023

(65) Prior Publication Data

US 2023/0292664 A1 Sep. 21, 2023

Related U.S. Application Data

(60) Provisional application No. 63/315,850, filed on Mar. 2, 2022.

(51) Int. Cl.
*A01D 41/127* (2006.01)
*G01D 5/14* (2006.01)

(52) U.S. Cl.
CPC ......... *A01D 41/1278* (2013.01); *G01D 5/145* (2013.01)

(58) Field of Classification Search
CPC ........................... A01D 41/1278; G01D 5/145
See application file for complete search history.

(56) References Cited

U.S. PATENT DOCUMENTS 2,419,061 A 4/1947 Emery
2,813,709 A 11/1957 Hyman
3,007,570 A 11/1961 Davidson
3,038,544 A 6/1962 Richey et al.
3,178,873 A 4/1965 Meyer
3,246,701 A 4/1966 Horst
3,271,940 A 9/1966 Robert
3,602,866 A 8/1971 Saxl
3,616,690 A 11/1971 Harden
3,780,817 A 12/1973 Videon
3,853,000 A 12/1974 Barnett
T934,002 I4 5/1975 Trail
(Continued)

FOREIGN PATENT DOCUMENTS

AU 2016287397 B2 6/2016
AU 2020201559 B2 4/2020
(Continued)

OTHER PUBLICATIONS

Baweja, Harjatin & Parhar, Tanvir & Mirbod, Omeed & Nuske, Stephen. (2018). StalkNet: A Deep Learning Pipeline for High-Throughput Measurement of Plant Stalk Count and Stalk Width.
(Continued)

*Primary Examiner* — Rami Khatib

(74) *Attorney, Agent, or Firm* — DENTONS DAVIS BROWN PC; Matthew Warner-Blankenship; Kassandra Rittmer

(57) ABSTRACT

A method for determining cross track error, comprising calibrating a stalk sensor with two or more set points, detecting plant stalks by the stalk sensor, measuring a stalk angle for each plant stalk, and measuring presence and amount of cross track error based on the stalk angle.

20 Claims, 15 Drawing Sheets

(56) References Cited

U.S. PATENT DOCUMENTS 3,972,381 A 8/1976 Gail
3,992,933 A 11/1976 Randolph
4,077,651 A 3/1978 Steinbach et al.
4,121,049 A 10/1978 Roeber
4,126,984 A 11/1978 Gail
4,155,417 A 5/1979 Ziems
4,166,349 A 9/1979 Coenenberg
4,197,690 A 4/1980 Eistert
4,295,323 A 10/1981 Maier et al.
4,319,643 A 3/1982 Carter et al.
4,362,218 A 12/1982 Shoberg
4,418,521 A 12/1983 Orlando
4,423,640 A 1/1984 Jetter
4,482,960 A 11/1984 Pryor
4,505,094 A 3/1985 Demorest
4,508,176 A 4/1985 Wiegardt
4,528,804 A 7/1985 Williams
4,751,849 A 6/1988 Paros
4,883,964 A 11/1989 Bohman
4,896,491 A 1/1990 Warnsholz
4,918,441 A 4/1990 Bohman
4,967,362 A 10/1990 Schutten
5,044,210 A 9/1991 Kuhn et al.
5,143,159 A 9/1992 Young
5,216,795 A 6/1993 Hansson
5,240,079 A 8/1993 Schmidt
5,253,172 A 10/1993 Ito
5,264,709 A * 11/1993 Kamimura ............ G01S 17/931 180/169
5,277,072 A 1/1994 Ort
5,279,068 A 1/1994 Rees et al.
5,343,761 A 9/1994 Myers
5,369,603 A 11/1994 Myers
5,463,854 A 11/1995 Chmielewski, Jr.
5,471,391 A 11/1995 Gudat
5,480,354 A 1/1996 Sadjadi
5,568,405 A 10/1996 Easton et al.
5,585,626 A 12/1996 Beck
5,598,794 A 2/1997 Harms et al.
5,638,988 A 6/1997 Rogers
5,646,844 A 7/1997 Caterpillar
5,680,750 A 10/1997 Stefl
5,751,576 A 5/1998 Monson
5,790,428 A 8/1998 Easton et al.
5,837,997 A 11/1998 Beck
5,847,290 A 12/1998 Kim
5,878,561 A 3/1999 Gunn
5,921,070 A 7/1999 Chamberlain
5,927,054 A 7/1999 Chamberlain
5,991,694 A 11/1999 Gudat et al.
5,995,902 A 11/1999 Monson
6,041,583 A 3/2000 Goering
6,058,343 A 5/2000 Orbach
6,073,427 A 6/2000 Nichols
6,085,846 A 7/2000 Buchl et al.
6,089,344 A 7/2000 Baughn
6,092,476 A 7/2000 Wilson
6,119,442 A 9/2000 Hale
6,198,992 B1 3/2001 Winslow
6,202,395 B1 3/2001 Gramm
6,216,795 B1 4/2001 Buchl
6,236,936 B1 5/2001 Berstis
6,272,819 B1 8/2001 Wendte
6,275,771 B1 8/2001 Berstis
6,338,023 B1 1/2002 Bourgeois
6,431,981 B1 8/2002 Shinners
6,463,374 B1 10/2002 Keller
6,484,078 B1 11/2002 Kageyama
6,490,539 B1 12/2002 Ukai
6,501,422 B1 12/2002 Nichols
6,529,823 B1 3/2003 Berstis
6,530,197 B1 3/2003 Christensen
6,584,390 B2 6/2003 Beck
6,615,570 B2 9/2003 Beck
6,668,223 B2 12/2003 Blackmore et al.
6,686,951 B1 2/2004 Dickson
6,732,024 B2 5/2004 Rekow
6,741,921 B2 5/2004 Caterpillar
6,774,320 B2 8/2004 Simons
6,856,879 B2 2/2005 Arakawa
6,876,920 B1 4/2005 Mailer
6,917,300 B2 7/2005 Allen
6,943,824 B2 9/2005 Deere
6,946,824 B2 9/2005 Waizman et al.
6,983,582 B1 1/2006 Muckler
7,171,769 B2 2/2007 Schultz
7,256,388 B2 8/2007 Eglington
7,349,779 B2 3/2008 Deere
7,350,806 B2 4/2008 Ridolfi
7,354,341 B1 4/2008 Smith
7,357,036 B2 4/2008 Steprath
7,360,623 B2 4/2008 Trimble
7,369,924 B2 5/2008 Han
7,401,506 B2 7/2008 Kunow
7,401,528 B2 7/2008 Deppermann et al.
7,628,239 B1 12/2009 Louie
7,647,753 B2 1/2010 Schlipf
7,648,004 B1 1/2010 Larouche
7,716,905 B2 5/2010 Wilcox et al.
7,734,386 B2 6/2010 DelNero
7,739,861 B2 6/2010 Mackin
7,777,615 B2 8/2010 Okuda
7,790,991 B2 9/2010 Verhaeghe
7,916,898 B2 3/2011 Anderson
8,006,472 B1 8/2011 Schreiner
8,010,261 B2 8/2011 Brubaker
8,078,338 B2 12/2011 Pack
8,126,620 B2 2/2012 Ringwald et al.
8,180,514 B2 5/2012 Kaprielian et al.
8,195,342 B2 6/2012 Anderson
8,196,380 B2 6/2012 Carboni
8,201,388 B1 6/2012 Vandeven
8,214,111 B2 7/2012 Heiniger et al.
8,215,191 B2 7/2012 Tragesser et al.
8,220,235 B2 7/2012 Kowalchuk
8,224,534 B2 7/2012 Kowalchuk
8,230,964 B2 7/2012 Markfort
8,392,065 B2 3/2013 Tolstedt
8,418,636 B2 4/2013 Liu et al.
8,437,901 B2 5/2013 Anderson
8,494,726 B2 7/2013 Peake
8,498,788 B2 7/2013 Kondekar
8,589,013 B2 11/2013 Pieper et al.
8,605,947 B2 12/2013 Zhang
8,634,993 B2 1/2014 McClure
8,639,408 B2 1/2014 Anderson
8,706,394 B2 4/2014 Trepagnier et al.
8,781,658 B2 7/2014 Simonini
8,781,685 B2 7/2014 McClure
8,814,640 B2 8/2014 Behnke et al.
8,820,039 B2 9/2014 Werning
8,892,308 B2 11/2014 Davis
8,987,615 B2 3/2015 Khatavkar
9,002,565 B2 4/2015 Jones
9,020,757 B2 4/2015 Peake
9,030,549 B2 5/2015 Redden
9,043,096 B2 5/2015 Zielke
9,052,714 B2 6/2015 Creasey et al.
9,064,173 B2 6/2015 Redden
9,066,463 B2 6/2015 Lange
9,098,085 B2 8/2015 Aznavorian
9,129,523 B2 9/2015 Martin
9,162,703 B2 10/2015 Miller et al.
9,188,986 B2 11/2015 Baumann
9,213,905 B2 12/2015 Lange et al.
9,232,693 B2 1/2016 Hendrickson et al.
9,265,187 B2 2/2016 Cavender-Bares
9,282,693 B2 3/2016 Anderson
9,310,329 B2 4/2016 Acheson et al.
9,320,196 B2 4/2016 Dybro et al.
9,322,629 B2 4/2016 Sauder et al.
9,360,383 B2 6/2016 Coleman
9,372,109 B2 6/2016 Acheson et al.
9,374,940 B2 6/2016 Nelson

(56) References Cited

U.S. PATENT DOCUMENTS 9,392,743 B2 7/2016 Camacho-Cook et al.
9,393,990 B2 7/2016 Davis
9,410,840 B2 8/2016 Acheson et al.
9,417,120 B2 8/2016 Zielke
9,420,203 B2 8/2016 Broggi et al.
9,420,737 B2 8/2016 Spiller et al.
9,423,249 B2 8/2016 Deppermann et al.
9,423,509 B2 8/2016 Georgy
9,446,791 B2 9/2016 Nelson, Jr.
9,451,367 B2 9/2016 Basseas
9,464,913 B2 10/2016 Brown et al.
9,485,914 B2 11/2016 Schleicher et al.
9,489,576 B2 11/2016 Johnson
9,503,850 B2 11/2016 Sheha
9,510,498 B2 12/2016 Tuttle et al.
9,527,211 B2 12/2016 Posselius et al.
9,545,048 B2 1/2017 Pickett et al.
9,565,802 B2 2/2017 Schleicher
9,578,804 B2 2/2017 Gessel
9,578,808 B2 2/2017 Dybro
9,582,002 B2 2/2017 Cavender-Bares
9,609,806 B2 4/2017 Schlipf
9,615,497 B2 4/2017 Bassett et al.
9,645,006 B2 5/2017 Phelan
9,658,201 B2 5/2017 Redden et al.
9,668,412 B2 6/2017 Ritter
9,668,420 B2 6/2017 Anderson
9,675,008 B1 6/2017 Rusciolelli et al.
9,693,496 B2 7/2017 Tevs et al.
9,693,503 B2 7/2017 Dybro et al.
9,696,162 B2 7/2017 Anderson
9,717,171 B2 8/2017 Redden et al.
9,750,173 B2 9/2017 Dix
9,756,771 B2 9/2017 Redden
9,795,074 B2 10/2017 Stratton
9,804,097 B1 10/2017 Tang et al.
9,804,603 B1 10/2017 Yegerlehner
9,807,934 B2 11/2017 Rusciolelli et al.
9,826,673 B1 11/2017 Ray
9,832,928 B2 12/2017 Dybro et al.
9,840,003 B2 12/2017 Stzatmary
9,849,828 B2 12/2017 Foster et al.
9,857,478 B2 1/2018 Joughin
9,861,040 B2 1/2018 Bonefas
9,867,334 B2 1/2018 Jongmans et al.
9,867,335 B1 1/2018 Obbink et al.
9,880,560 B2 1/2018 Han
9,894,835 B2 2/2018 Sauder et al.
9,898,688 B2 2/2018 Bleiweiss
9,921,064 B2 3/2018 Schleicher
9,927,242 B2 3/2018 Schleicher
9,936,631 B1 4/2018 Hubner et al.
9,936,637 B2 4/2018 Anderson
9,964,559 B2 5/2018 Zielke
9,972,058 B2 5/2018 Romier
9,974,233 B2 5/2018 Ueda et al.
9,983,048 B1 5/2018 Meier
9,996,081 B2 6/2018 Owens
10,034,424 B2 7/2018 Anderson
10,039,228 B2 8/2018 Walker
10,039,231 B2 8/2018 Anderson et al.
10,065,722 B1 9/2018 Jaszewski
10,099,609 B2 10/2018 Pagliani
10,104,822 B2 10/2018 Couchman
10,104,827 B2 10/2018 Adamchuk
10,114,378 B2 10/2018 Korthals
10,130,022 B2 11/2018 Kinze
10,130,035 B2 11/2018 Crow
10,131,376 B2 11/2018 Mortimer
10,143,126 B2 12/2018 Foster et al.
10,152,891 B2 12/2018 Rusciolelli et al.
10,165,722 B2 1/2019 Ackerman et al.
10,168,714 B2 1/2019 Webber
10,178,828 B2 1/2019 Hendrickson et al.
10,188,037 B2 1/2019 Sauder
10,206,324 B2 2/2019 Gerrish
10,215,572 B2 2/2019 Urano et al.
10,246,087 B2 4/2019 Mitchell et al.
10,254,765 B2 4/2019 Rekow et al.
10,255,670 B1 4/2019 Wu et al.
10,264,431 B2 4/2019 Vandapel et al.
10,267,820 B2 4/2019 Zielke
10,272,940 B2 4/2019 Staehle
10,295,703 B2 5/2019 Dybro
10,299,422 B2 * 5/2019 Schleicher .......... A01M 7/0089
10,324,471 B2 6/2019 Etoh
10,328,934 B2 6/2019 Minster
10,338,594 B2 7/2019 Long
10,365,404 B2 7/2019 Collins
10,384,709 B2 8/2019 Joughin
10,398,084 B2 9/2019 Ray et al.
10,407,873 B2 9/2019 Ono
10,412,893 B2 9/2019 Missotten et al.
10,473,592 B2 11/2019 Kramer et al.
10,479,354 B2 11/2019 Posselius
10,491,879 B2 11/2019 Redden
10,531,603 B2 1/2020 Ferrari
10,537,060 B2 1/2020 Sauder et al.
10,551,844 B2 2/2020 Biber
10,575,453 B2 3/2020 Blackwell
10,582,662 B2 3/2020 Ricketts
10,583,832 B2 3/2020 Foster
10,612,932 B2 4/2020 Sunil Kumar
10,633,023 B2 4/2020 Ghannam
10,635,110 B2 4/2020 Shashua
10,684,305 B2 6/2020 Zielke et al.
10,696,227 B2 6/2020 Stein
10,698,402 B2 6/2020 Kosa
10,713,768 B2 7/2020 Berghoefer
10,747,233 B2 8/2020 Ogura
10,780,930 B1 9/2020 Kentley-Klay
10,788,835 B2 9/2020 Hurd et al.
10,795,351 B2 10/2020 Hurd
10,820,508 B2 11/2020 Dix
10,822,017 B2 11/2020 Tan
10,845,810 B2 11/2020 Flajolet
10,859,479 B2 12/2020 Brune et al.
10,912,247 B2 2/2021 Wolters
10,962,376 B2 3/2021 Fong
10,966,369 B2 4/2021 Suleman
11,006,564 B2 5/2021 Foster
11,048,938 B2 6/2021 Hundley et al.
11,064,653 B2 7/2021 Zielke
11,079,725 B2 8/2021 Palla
11,091,192 B2 8/2021 McMickell
11,092,696 B2 8/2021 Eriksson
11,093,745 B2 8/2021 Redden
11,112,262 B2 9/2021 Anderson
11,129,333 B2 9/2021 Derscheid
11,212,954 B2 1/2022 Maeder
11,234,366 B2 2/2022 Darr
11,275,941 B2 3/2022 Papanikolopoulos et al.
11,297,768 B2 4/2022 Schildroth
11,315,258 B1 4/2022 Anagnostopoulos
11,429,114 B2 8/2022 Davis
11,432,464 B2 9/2022 Hayashi
11,612,096 B2 3/2023 Sivinski
11,678,607 B2 6/2023 Zielke
11,697,414 B2 7/2023 Simmons
11,704,810 B2 7/2023 Sneyders
11,758,845 B2 9/2023 Zielke
11,758,848 B2 9/2023 Eichhorn
11,790,539 B1 10/2023 Anagnostopoulos
2001/0048755 A1 12/2001 Wiens
2002/0059320 A1 5/2002 Tamaru
2002/0072850 A1 6/2002 McClure
2002/0091458 A1 7/2002 Moore
2002/0173893 A1 11/2002 Blackmore et al.
2003/0019196 A1 1/2003 Coers
2003/0023353 A1 1/2003 Badarneh
2003/0085042 A1 5/2003 Rogala
2003/0187577 A1 10/2003 McClure
2004/0004544 A1 1/2004 Scott
2004/0050138 A1 3/2004 Beck

(56) References Cited

U.S. PATENT DOCUMENTS

2004/0158355 A1 8/2004 Holmqvist
2004/0194442 A1 10/2004 Maertens
2004/0264761 A1 12/2004 Mas
2005/0074143 A1 4/2005 Kawai
2006/0178825 A1 8/2006 Eglington
2007/0021913 A1 1/2007 Heiniger
2007/0044445 A1 3/2007 Spicer et al.
2007/0071311 A1 3/2007 Rovira-Mas
2007/0112700 A1 5/2007 Den Haan
2007/0228707 A1 10/2007 Curtis
2007/0289281 A1 12/2007 Altepost
2008/0046154 A1 2/2008 Bares
2008/0103690 A1 5/2008 Dix
2008/0141814 A1 6/2008 Markfort
2008/0215203 A1 9/2008 Dix
2008/0269956 A1 10/2008 Dix
2008/0289308 A1 11/2008 Brubaker
2008/0306655 A1 12/2008 Dickson
2009/0037041 A1 2/2009 Senneff
2009/0099730 A1 4/2009 McClure
2009/0112410 A1 4/2009 Shull
2009/0118904 A1 5/2009 Birnie
2009/0192734 A1 7/2009 Mackin
2010/0006308 A1 1/2010 Schmidt
2010/0026555 A1 2/2010 Whittaker
2010/0032492 A1 2/2010 Grimm
2010/0089178 A1 4/2010 Tragresser
2010/0094481 A1 4/2010 Anderson
2010/0228521 A1 9/2010 Hamamoto
2011/0056753 A1 3/2011 Middlemiss
2011/0056762 A1 3/2011 Markfort
2011/0098890 A1 4/2011 Lee
2011/0118926 A1 5/2011 Peake
2011/0173942 A1 7/2011 Kowalchuk
2011/0196565 A1 8/2011 Collins
2011/0235923 A1 9/2011 Weisenburger
2011/0307149 A1 12/2011 Pighi
2012/0029757 A1 2/2012 Kowalchuk
2012/0042618 A1 2/2012 Lohrentz
2012/0042619 A1 2/2012 Lohrentz et al.
2012/0050023 A1 3/2012 Sauder
2012/0055131 A1 3/2012 Zegota
2012/0055133 A1 3/2012 Lohrentz
2012/0130593 A1 5/2012 Davis
2012/0200697 A1 8/2012 Wuestefeld
2012/0204528 A1 8/2012 Regier
2012/0215410 A1 8/2012 McClure
2012/0253611 A1 10/2012 Zielke
2013/0125800 A1 5/2013 Landphair et al.
2013/0131925 A1 5/2013 Isaji
2013/0152535 A1 6/2013 Roberge
2013/0186657 A1 7/2013 Kormann et al.
2013/0317696 A1 11/2013 Koch
2014/0020354 A1 1/2014 Tilly
2014/0116077 A1 5/2014 Pierce
2014/0116735 A1 5/2014 Bassett
2014/0163806 A1 6/2014 Aznavorian
2014/0230391 A1 8/2014 Hendrickson
2014/0230580 A1 8/2014 Dybro
2014/0236381 A1 8/2014 Anderson
2014/0294247 A1 10/2014 Sirault
2014/0311113 A1 10/2014 Bonefas
2014/0324291 A1 10/2014 Jones
2014/0331631 A1 11/2014 Sauder
2015/0041238 A1 2/2015 Davis
2015/0081156 A1 3/2015 Trepagnier
2015/0082760 A1 3/2015 Zentner
2015/0082780 A1 3/2015 Dueckinghaus
2015/0237795 A1 8/2015 Koch
2015/0245560 A1 9/2015 Middelberg
2015/0253427 A1 9/2015 Slitcher
2015/0257337 A1 9/2015 Schrattenecker
2015/0264866 A1 9/2015 Foster
2015/0289438 A1 10/2015 Sauder et al.
2015/0293029 A1 10/2015 Acheson
2015/0293068 A1 10/2015 Acheson et al.
2015/0302305 A1 10/2015 Rupp
2015/0319929 A1 11/2015 Hendrickson
2015/0321694 A1 11/2015 Nelson
2015/0327440 A1 11/2015 Dybro
2015/0334920 A1 11/2015 Schleicher
2015/0343403 A1 12/2015 Ruhland
2015/0359163 A1 12/2015 Nelson
2016/0018528 A1 1/2016 Schneider
2016/0037709 A1 2/2016 Sauder et al.
2016/0041803 A1 2/2016 Markov
2016/0077075 A1 3/2016 Reich
2016/0084813 A1 3/2016 Anderson
2016/0084987 A1 3/2016 Dybro
2016/0120129 A1 5/2016 Verhaeghe
2016/0174465 A1 6/2016 Kohls
2016/0214643 A1 7/2016 Joughin
2016/0229555 A1 8/2016 Millin
2016/0252384 A1 9/2016 Wilson
2016/0280250 A1 9/2016 Stahle
2016/0338267 A1 11/2016 Anderson
2016/0345485 A1 12/2016 Acheson
2017/0016870 A1 1/2017 McPeek
2017/0061211 A1 3/2017 Hundley et al.
2017/0089742 A1 3/2017 Bruns
2017/0102702 A1 4/2017 Ishijima
2017/0122740 A1 5/2017 Schleicher
2017/0135277 A1 5/2017 Hiramatsu
2017/0147005 A1 5/2017 Ramm
2017/0199528 A1 7/2017 Detweiler
2017/0228118 A1 8/2017 Sugumarn et al.
2017/0242095 A1 8/2017 Schuh
2017/0248963 A1 8/2017 Levinson et al.
2017/0249517 A1 8/2017 Cho
2017/0251600 A1 9/2017 Anderson
2017/0297621 A1 10/2017 Bunderson
2017/0332551 A1 11/2017 Todd
2017/0339827 A1 11/2017 Anderson
2017/0357267 A1 12/2017 Foster et al.
2017/0359941 A1 12/2017 Czapka
2018/0017965 A1* 1/2018 Kosa ..................... A01D 46/30
2018/0024549 A1 1/2018 Hurd
2018/0068416 A1 3/2018 Chandra
2018/0081058 A1 3/2018 Kalscheur
2018/0084725 A1 3/2018 Ostermeier
2018/0084727 A1 3/2018 Andrios
2018/0092303 A1 4/2018 Goering
2018/0096605 A1 4/2018 Bai
2018/0121725 A1 5/2018 Redden
2018/0164471 A1 6/2018 Dybro
2018/0172838 A1 6/2018 Junker
2018/0199509 A1 7/2018 Ricketts
2018/0201299 A1 7/2018 Ashtari
2018/0216942 A1 8/2018 Wang
2018/0228086 A1 8/2018 Cook
2018/0238730 A1 8/2018 Meier
2018/0252742 A1 9/2018 Zielke
2018/0326982 A1 11/2018 Paris
2018/0329415 A1 11/2018 Aoi
2018/0338423 A1 11/2018 Lucca
2018/0368321 A1 12/2018 Noonan
2018/0373259 A1 12/2018 Aberle
2019/0000007 A1 1/2019 Schleicher
2019/0021211 A1 1/2019 Gutknecht
2019/0039626 A1 2/2019 Hatano
2019/0059223 A1 2/2019 Seiders
2019/0071092 A1 3/2019 Ma
2019/0075706 A1 3/2019 Cavender-Bares et al.
2019/0090472 A1 3/2019 Crinklaw
2019/0110394 A1 4/2019 VanNahmen
2019/0124822 A1 5/2019 Czapka
2019/0133024 A1 5/2019 Gerrish
2019/0146511 A1 5/2019 Hurd et al.
2019/0150357 A1 5/2019 Wu
2019/0174667 A1 6/2019 Gresch
2019/0195762 A1 6/2019 Brune
2019/0258859 A1 8/2019 Baynes
2019/0261561 A1 8/2019 Heitmann
2019/0275939 A1 9/2019 Kim

(56) References Cited

U.S. PATENT DOCUMENTS

2019/0302799 A1 10/2019 Schaff
2019/0343035 A1 11/2019 Smith
2019/0373801 A1 12/2019 Schoeny
2020/0000031 A1 1/2020 Koch
2020/0000034 A1 1/2020 Schlipf
2020/0008351 A1 1/2020 Zielke
2020/0021716 A1 1/2020 Sneyders
2020/0023835 A1 1/2020 Harda
2020/0029487 A1 1/2020 Dix
2020/0033143 A1 1/2020 Hiramatsu
2020/0053961 A1 2/2020 Dix
2020/0060056 A1 2/2020 Koch
2020/0068803 A1 3/2020 Sauder et al.
2020/0084951 A1 3/2020 Fanshier
2020/0100421 A1 4/2020 Wang
2020/0128734 A1 4/2020 Brammeier
2020/0133262 A1 4/2020 Suleman
2020/0150673 A1 5/2020 Qiu
2020/0178455 A1 6/2020 Ishikawa
2020/0193589 A1 6/2020 Peshlov et al.
2020/0221635 A1 7/2020 Hendrickson
2020/0231210 A1 7/2020 Anderson
2020/0319655 A1 10/2020 Desai
2020/0326674 A1 10/2020 Palla
2020/0352082 A1 11/2020 Maeder et al.
2020/0352088 A1 11/2020 Arnett
2020/0394580 A1 12/2020 Bull
2021/0000006 A1 1/2021 Ellaboudy
2021/0003416 A1 1/2021 Wilson et al.
2021/0026362 A1 1/2021 Wilson et al.
2021/0051837 A1 2/2021 Barry et al.
2021/0051849 A1 2/2021 Asebedo
2021/0053561 A1 2/2021 Beller
2021/0059114 A1 3/2021 Eichhorn
2021/0076569 A1 3/2021 Blank
2021/0094539 A1 4/2021 Beller
2021/0132618 A1* 5/2021 Van Roekel .......... B60W 30/10
2021/0161060 A1 6/2021 Kaufmann
2021/0168991 A1 6/2021 Dix
2021/0185882 A1 6/2021 Eichhorn
2021/0195824 A1* 7/2021 Van Roekel ......... A01B 69/008
2021/0195840 A1 7/2021 Puryk
2021/0289707 A1 9/2021 Schloesser
2021/0294337 A1 9/2021 Van Mill
2021/0315147 A1 10/2021 Fanshier
2021/0315160 A1 10/2021 Zielke
2021/0318118 A1 10/2021 Eichhorn
2021/0321567 A1 10/2021 Sidon
2021/0329837 A1 10/2021 Schnaider
2021/0329838 A1 10/2021 Zielke
2021/0340794 A1 11/2021 Dickinson
2021/0352847 A1 11/2021 Hunt
2021/0364631 A1 11/2021 Hasegawa et al.
2021/0365036 A1 11/2021 Dix
2021/0396528 A1 12/2021 St. Romain
2022/0000024 A1 1/2022 Zielke
2022/0000029 A1 1/2022 Ricketts
2022/0011444 A1 1/2022 Eichhorn et al.
2022/0019240 A1 1/2022 Christiansen
2022/0026226 A1 1/2022 Eichhorn
2022/0061202 A1 3/2022 Holoubek et al.
2022/0071093 A1 3/2022 Risius
2022/0078975 A1* 3/2022 Slichter .................. A01D 75/00
2022/0105932 A1 4/2022 Omikawa
2022/0130145 A1 4/2022 Connary
2022/0132737 A1 5/2022 Anderson
2022/0192082 A1 6/2022 Rosenberg
2022/0225569 A1 7/2022 Zielke
2022/0232759 A1* 7/2022 Sauder ................. A01C 23/042
2022/0272888 A1 9/2022 Hodel
2022/0284669 A1 9/2022 Heinonen
2022/0317688 A1 10/2022 Li
2022/0332365 A1 10/2022 Calderon
2022/0363280 A1 11/2022 Calderon
2022/0365163 A1 11/2022 Baek
2022/0386527 A1* 12/2022 Schleicher ............. A01D 47/00
2022/0410704 A1 12/2022 O'Connor
2023/0000015 A1 1/2023 Herrmann
2023/0073551 A1 3/2023 Holoubek
2023/0124026 A1 4/2023 Hansen
2023/0139169 A1 5/2023 Cleodolphi
2023/0189690 A1 6/2023 Friedlein
2023/0229163 A1* 7/2023 Rust ..................... G05D 1/0212
701/50
2023/0230202 A1 7/2023 Eichhorn et al.
2023/0240185 A1 8/2023 Zielke
2023/0243693 A1 8/2023 McClelland
2023/0270039 A1 8/2023 Fanshier
2023/0292647 A1 9/2023 Bainbridge
2023/0292664 A1 9/2023 Zielke et al.
2023/0389473 A1 12/2023 Reed
2023/0401703 A1 12/2023 Friedlein
2024/0000011 A1 1/2024 Zielke et al.
2024/0023482 A1 1/2024 Zielke
2024/0044346 A1 2/2024 Barry et al.
2024/0053759 A1 2/2024 Wilson
2024/0065156 A1 2/2024 Woodcock
2024/0081171 A1 3/2024 Schwartz
2024/0090379 A1 3/2024 Eichhorn
2024/0184299 A1 6/2024 Baldwin
2024/0224870 A9 7/2024 Baldwin
2024/0273717 A1 8/2024 Agarwal
2024/0373785 A1 11/2024 Risius
2024/0381803 A1 11/2024 Wagner
2024/0389494 A1* 11/2024 Vorobiev ............. A01B 69/001
2025/0002070 A1 1/2025 Brand
2025/0008874 A1 1/2025 Townsend
2025/0169390 A1 5/2025 Eichhorn
2025/0185540 A1 6/2025 Eichhorn
2025/0194459 A1 6/2025 Roe
2025/0241246 A1 7/2025 Woodcock
2025/0256762 A1 8/2025 Johnson
2025/0351773 A1 11/2025 Zielke
2025/0362373 A1 11/2025 Calderon
2026/0041024 A1 2/2026 Risius
2026/0060174 A1 3/2026 Zielke
2026/0083057 A1 3/2026 Zielke
2026/0084616 A1 3/2026 Wilson
2026/0096511 A1 4/2026 Zielke
2026/0107878 A1 4/2026 Risius
2026/0110552 A1 4/2026 Johnson
2026/0137029 A1 5/2026 Friedlein
2026/0150775 A1 6/2026 Wilson

FOREIGN PATENT DOCUMENTS

BE 1023764 B1 7/2017
BR 102017018379 A2 5/2018
CA 2313376 A1 7/2000
CN 108362267 A 8/2018
DE 1928065 A1 5/1970
DE 102009039450 A1 5/2010
DE 102013203549 A1 9/2014
DE 102013110498 A1 3/2015
DE 112014000906 T5 11/2015
EP 2191439 B1 2/2009
EP 2047738 A2 4/2009
EP 1773647 B1 2/2010
EP 2511152 A1 10/2012
EP 3146831 B1 3/2017
EP 2944179 B1 11/2017
EP 3245859 A1 11/2017
EP 3245859 B1 4/2019
EP 3095313 B1 5/2019
EP 3972381 A1 3/2022
JP 6216795 B2 10/2017
JP 2017211733 A 11/2017
JP 2021101303 A 7/2021
JP 2022060934 A 4/2022
KR 101728137 B1 4/2017
NO 861970 L 11/1986
WO 2012027364 A2 3/2012
WO 2013078328 A2 5/2013
WO 2017004074 A1 1/2017

(56) References Cited

FOREIGN PATENT DOCUMENTS

| | | | |
|---|---|---|---|
| WO | 2017074863 | A1 | 5/2017 |
| WO | 2018055921 | A1 | 3/2018 |
| WO | 2018165199 | A4 | 9/2018 |
| WO | 2019042956 | A1 | 3/2019 |
| WO | 2023288249 | A1 | 1/2023 |

OTHER PUBLICATIONS

Birrell et al, "Corn Population Sensor for Precision Farming", "American Society of Agricultural Engineers. Annual Meeting", 1995, vol. 95, No. 1334, Publisher: ASAE.

D. Easton, "Corn Population and Plant Spacing Variability: The Next Mapping Layer", 1996, pp. 723-727, Publisher: ASA-CSSA-SSSA, Published in: Madison, WI.

Drago, Row by Row 2020 Special Report Harvest Study Reveals Most Corn Heads Leaving Yield in the Field.

Farm Show, "Easton Goers, Inc. Space Wheel Checks Seed Placement In Field—Space Cadet", 1996, Publisher: Farm Show.

Gore, L. M. 1996. Report: Stalk counter for VRT study fall of 1995. Deere & Co. Moline, IL.

Haizhou Li, "Design and Evaluation of a Non-Intrusive Corn Population Sensor", "Trace: Tennessee Research and Creative Exchange, Doctoral Dissertations, Graduate School", Aug. 2007, Publisher: University of Tennessee, Knoxville.

Headsight, Inc., "Row Guidance for Corn", Jan. 2021, https://headsight.com/row-guidance-corn.

Hummel et al., "Sensing Corn Population—Another Variable in the Yield Equation".

John Deere SSA, "Auto Trac RowSense | Precision AG | John Deere SSA", Jan. 2021, https://www.deere.com/sub-saharan/en/technology-products/precision-ag/autotrac-rowsense/.

Jonathan P. Kelly, "By-Plant Prediction of Corn (*Zea mays* L.) Grain Yield Using Height and Stalk Diameter", 2009, Publisher: Faculty of the Graduate College of the Oklahoma State University.

Luck et al., "Sensor Ranging Technique for Determining Corn Plant Population", "Faculty Papers and Publications in Animal Science—Animal Science Department", 2008, vol. 920, Publisher: University of Nebraska—Lincoln.

Plattner, C. E., J. W. Hummel 1996. Corn Plant Population Sensor for Precision Agriculture. In: P.C. Robert, R.H. Rust, W.E. Larson, editors, Precision Agriculture, ASA, CSSA, SSSA, Madison, WI. p. 785-794.

Reichhardt Electronic Innovations, "PSR Sensor Guidance", Jan. 2021, www.reichhardt.com/us_products_autosteer-system_autoguidance-tac.html.

Shrestha et al., "Automatic Corn Plant Population Measurement Using Machine Vision", "Transactions of the ASAE", 2003, pp. 559-565, vol. 46(2), Publisher: American Society of Agricultural Engineers.

Sudduth, K.A., Birrell, S.J., Krumpelman, M.J., Robert, P., Rust, R.H., & Larson, W.E. (2000). Field evaluation of a corn population sensor.

Yeyin Shi, "Corn Plant Location, Spacing and Stalk Diameter Measurements Using Optical Sensing Technologies", May 2014, Publisher: Faculty of the Graduate College of the Oklahoma State University.

Yu, H. Zheng, S. R. Kulkarni, H. V. Poor, "Outlier elimination for robust ellipse and ellipsoid fitting," in Proc. 3rd IEEE Int. Workshop Comput. Adv. Multi-Sensor Adapt. Process. (CAMSAP), Aruba, Dutch Antilles, Dec. 2009, pp. 33-36.

Contributions to Wikimedia projects (Feb. 20, 2020), Numerical integration. Wikipedia. Https://web.archive.org/web/20200325094046/https://en.wikipedia.org/wiki/numerical_integration (Year: 2020).

Area of a circle (Mar. 10, 2020). Wikipedia. Https://web.archive.org/web/20200325064526/https://en.wikipedia.org/wiki/Area_of_acircle (year 2020).

Miller et al (Nov. 16, 2016). The Plant Journal. https://onlinelibrary.wiley.com/doi/pdf/10.1111/tpj.13320.

Of GIS AG Maps (here in as "GIS), "Yield Monitor Data Post-Calibration (Linear and Non-Linear) Examples, Jan. 20, 2022, 8 pages + 1 SS page (9 pgs total).

Ag Leader Technology—OnTrac3 Operators Manual PN2006236—ENG REV. B, 2014.

Agjunction—Wheelman Flex Installation Guide, Fit Kit: 810-0036-01.

Bruns, Lidar-based Vehicle Localization in an Autonomous Valet Parking Scenario, 2016.

Case IH Active Implement Guidance—https://www.youtube.com/watch?v=Kb059Tj1Q_k.

CHCNAV—ANX510 SE AutoSteer.

Cho-1999, Autonomous Seed sprayer guidance using machine vision and fuzzy logic, Cho, S.I. Ki, N. H., 1999.

DroneDeploy, Measurement Accuracy of the DJI Phantom 4 RTK & Photogrammetry, J. Mulakala, Date Unknown—available as early as 2019, pp. 1-18.

Ehab Ghanem, Kyle O'Keefe, and Richard Klukas. Testing vehicle-to-vehicle relative position and at-titude estimation using multiple uwb ranging. In 2020 IEEE 92nd Vehicular Technology Conference (VTC2020-Fall), pp. 1-5. IEEE, 2020.

English-2014, Vision Based guidance for robot navigation in agriculture, Andrew English et al., Jun. 7, 2014.

FJDynamics—GPS Guidance Auto Steer System for Tractor.

FJDynamics—Navigate to Next-level Efficiency—FJD AT2 Auto Steer System.

Gyubeom et al., Parking Line Based SLAM Approach Using AVM/LiDAR Sensor Fusion for Rapid and Accurate Loop Closing and Parking Space Detection, Nov. 5, 2019.

John Deere—AutoTrac Universal (ATU) Steering Kit, 2007.

John Deere—Precision Ag Technology—Auto Trac Universal 300.

John Deere Machine Sync—Machine Sync Activation, https://www.deere.com/en/technology-products/precision-ag-technology/guidance/machine-sync/, Unknown—available as early as 2018, Publisher: John Deere.

Leonard et al, Dyanmic map build for an autonomous mobile robot, Aug. 1, 1992.

Muller Elektronik Gmbh & Co. KG, "Installation and Operating Instructions Trail-Control Manufacturer", Mar. 2001, Published in: Germany.

Muller-Elektronik Gmbh & Co.KG, "Hardi Auto-Track Instruction Book", Jan. 10, 1996, Published in: Germany.

Muller-Elektronik Gmbh & Co.KG, "Installation and Users Guide TRAIL-Control II", Sep. 1, 2010, Published in: Germany.

Orthman—Tracker implement guidance—Date Unknown available as early as 2012—https://www.facebook.com/orthmanag/videos/tracker-implement-guidance/3057072390855/.

Orthman—GPS Tracker IV, https://orthman.com.au/implement-guidance/.

P. Barry and R. Coakley, 2015, Accuracy of UAV Photogrammetry Compared with Network RTK GPS.

Pajares-2016, Machine-Vision systems selection for agricultural vehicles: A Guide, Ganzalo Pajares, et al., Nov. 22, 2016.

PIX4D, Do RTK/PPK Drones give you better results than GCPs?, Aug. 26, 2017 https://www.pix4d.com/blog/rtk-ppk-drones-gcp-comparison.

PIX4D, Ground Control Points: why are they important?, Dec. 3, 2019, https://www.pix4d.com/blog/why-ground-control-points-important.

PIX4D, How to Calibrate a perspective lens camera, https://support.pix4d.com/hc/en-us/articles/206065716-How-to-calibrate-a-Perspective-Lens-Camera, Unknown—available as early as 2017.

Protracker Guidance Systems—300DB Hydraulic Hitch Specifications.

Rankin 2008, Daytime mud detection for unmanned ground vehicle autonomous navigation, A.L. Rankin and L. H. Matthies, Date Unknown—available as early as 2008, pp. 1-9, Publisher: Jet Propulsion Laboratory, California Institute of Technology.

Raven Industries—Direcsteer, available as early as 2023.

Raven Industries—SmartTrax MD Installation Manual, 2013.

Raven Precision, Viper 4+ Job Sync https://www.youtube.com/watch?v=ql8Q45OSxVU, Aug. 7, 2018, Youtube.

Reid-1998, Precision guidance of agricultural vehicles, John F. Reid, 1998.

(56) References Cited

OTHER PUBLICATIONS

Rovira-Mas-2008, Stereo Vision three dimensional terrain maps for precision agriculture, Francisco Rovira—Mas Qin Zhang B John F Reidc, Mar. 2008.
Saarinen et al., 3D normal distributions transform occupancy maps; an efficient representation for mapping in dynamic environments, Saarinen, Jari P. et al., Sep. 16, 2013.
Raven Cart Automation, https://www.ravenind.com/products/autonomy/raven-cart-automation.
Subramanian—2006, Development of machine vision and laser radar based autonomous vehicle guidance, VijaySubramaniana, Thomas F Burksa A A Arroyob, Sep. 2006.
SUNCO Farm Equipment—Pull Implement Guidance.
John Deere FarmSight—Active Implement Guidance, available as early as 2013—https://www.youtube.com/watch?v=JqBM1hH_MBs.
Trimble—EZ-Pilot Pro Guidance System, 2018.
Trimble—EZ-Steer System, 2010.
Unverferth Mfg. Co., Inc., "Top Air Steerable Hitch", Date Unknown—available as early as 2016, Published in: Kalida, OH.
Wei Jiang, Zhuojian Cao, Baigen Cai, Binghao Li, and Jian Wang. Indoor and outdoor seamless po-sitioning method using uwb enhanced multi-sensor tightly-coupled integration. IEEE Transactions on Vehicular Technology, 70 (10): 10633-10645, 2021.
Yu Xianjia, Li Qingqing, Jorge Pena Queralta, Jukka Heikkonen, and Tomi Westerlund. Cooperative uwb-based localization for outdoors positioning and navigation of uavs aided by ground robots. In 2021 IEEE International Conference on Autonomous Systems (ICAS), pp. 1-5. IEEE, 2021.
Anand et al., "AgriSegNet: Deep Aerial Semantic Segmentation Framework for IoT-Assisted Precision Agriculture", IEEE Sensors Journal, 2021, pp. 17581-17590, vol. 21, No. 16.
Bhagat et al., "MS-Net: A CNN Architecture for Agriculture Pattern Segmentation in Aerial Images", 2022, Publisher: Cham: Springer International Publishing.
Imai et al., "Shadow detection in hyperspectral images acquired by UAV", The International Archives of Photogrammetry, Remote Sensing and Spatial Information Sciences, 2019, pp. 371-377.
Innani et al., "Fuse-pn: A novel architecture for anomaly pattern segmentation in aerial agricultural images", 2021.
Shrestha et al., "Automatic Corn Plant Population Measurement Using Machine Vision", Agricultural and Biosystems Engineering Conference Proceedings and Presentations., 2001, No. 37.
Shrestha et al., "Shape and Size Analysis of Corn Plant Canopies for Plant Population and Spacing Sensing", 2005, pp. 295-303.
Tang et al., "Plant Identification in Mosaicked Crop Row Images for Automatic Emerged Corn Plant Spacing Measurement", 2008, pp. 2181-2191.
Thorp et al., "Using Aerial Hyperspectral Remote Sensing Imagery to Estimate Corn Plant Stand Density", 2008, pp. 311-320.
Wolters, D., "Assessment of Corn Plant Population at Emergence from Processed Color Aerial Imagery", 2015.
AutoFarm—OnTrac2, Date Unknown available as early as 2009, https://www.farmprogress.com/farming-equipment/autofarm-introduces-ontrac2-gps-assisted-steering-system.
Novariant—Ontrac2+, Date Unknown available as early as 2012.
Protracker Guidance Systems—400DB Hydraulic Hitch Specifications.
Ashley Napier, Paul Newman, "Generation and Exploitation of Local Orthographic Imagery for Road Vehicle Localisation", 2012, 2012 IEEE Intelligent Vehicles Sysmposium, pp. 590-596, DOI: 10.1109/IVS.2012.6232165.
GameMaker Community—https://forum.gamemaker.io/index.php?threads/sprite-real-time-multi-recoloring-using-shaders. 12601, 2016.
SunNav, AG400 GNSS Auto-Steering System.
Mike Williams, Google Maps Review; https://web.archive.org/web/20210128011918/https://www.pcmag.com/reviews/google-maps (Year: 2021).
Sprague et al., "Corn Ear Detection and Orientation Estimation Using Deep Learning", 2024, https://arxiv.org/abs/2412.14954.
Lensing, Keith, "Algorithm Development of a Multi-Section Crop Detection System for a Corn Head", 2015, https://dr.lib.iastate.edu/entities/publication/8cb6f0d6-31e2-4ff9-8c1e-eb70dc210e5f.
Li, Dawei, et al. "An overlapping-free leaf segmentation method for plant point clouds." IEEE Access 7 (2019): 129054-129070 (Year: 2019).
Luck et al., "Precision Agriculture—Best Management Practices for Collecting Accurate Yield Data and Avoiding Errors during Harvest", 2014, 6 pages.
Gao et al., "Towards agricultural autonomy: crop row detection under varying field conditions using deep learning," Sep. 16, 2021, https://arxiv.org/abs/2109.08247 (Year: 2021).

* cited by examiner

CROSS TRACK ERROR SENSOR AND RELATED DEVICES, SYSTEMS, AND METHODS

CROSS-REFERENCE TO RELATED APPLICATION(S)

This application claims the benefit under 35 U.S.C. § 119(e) to U.S. Provisional Application 63/315,850, filed Mar. 2, 2022, and entitled CROSS TRACK ERROR STALK SENSOR, which is hereby incorporated herein by reference in its entirety for all purposes.

TECHNICAL FIELD

The disclosure relates to devices systems and methods for agricultural harvesting and more particularly determining cross track error.

BACKGROUND

The disclosure relates to cross track error is recognized cause of lost yield and thereby economic harm for farmers and other stakeholders. The ability to determine cross track error and correct cross track error is important to maximizing yields and reducing lost yield.

BRIEF SUMMARY

In Example 1 a method for determining cross track error, comprising calibrating a stalk sensor with two or more set points, detecting plant stalks by the stalk sensor, measuring a stalk angle for each plant stalk, and measuring presence and amount of cross track error based on the stalk angle.

Example 2 relates to the method of Example 1, further comprising instructing a vehicle guidance system to correct measured cross track error.

Example 3 relates to the method of Example 1, further comprising filtering signals for the stalk sensor to exclude signals not from plant stalks.

Example 4 relates to the method of Example 1, further comprising resetting calibration values for the two or more set point when a stripper plate moves.

Example 5 relates to the method of Example 1, wherein the two or more set point comprise a zero-degree set point and a twenty-five-degree set point.

Example 6 relates to the method of Example 1, wherein when a sensor signal from a left sensor member is greater than a zero-degree set point cross track error to the right is measured.

Example 7 relates to the method of Example 1, wherein when a sensor signal from a right sensor member is greater than a zero-degree set point cross track error to the left is measured.

Example 8 relates to the method of Example 1, wherein when a sensor signal from a left sensor member and a right sensor member are less than a zero-degree set point for the left sensor member and the right sensor member no cross track error is indicated.

Example 9 relates to the method of Example 1, wherein the amount of cross track error is equal to header height multiplied by Tan (stalk angle).

In Example 10 a system for measuring and correcting cross track error comprising a stalk sensor configured to detecting stalk presence and record a series of stalk sensor signals, a database comprising recorded values of two or more set points for the stalk sensor for determining a stalk angle from the series of stalk sensor signals, and a processor in communication with the stalk sensor configured to measure cross track error from the stalk angle, wherein cross track error is equal to a header height multiplied by Tan (stalk angle).

Example 11 relates to the system of Example 10, wherein the stalk sensor is a contact sensor comprising a left sensor member and a right sensor member.

Example 12 relates to the system of Example 11, wherein the two or more set point comprising a zero-degree set point.

Example 13 relates to the system of Example 12, wherein cross track error to the right is indicated then a peak reading from the left sensor member is greater than the zero-degree set point.

Example 14 relates to the system of Example 12, wherein cross track error to the left is indicated then a peak reading from the right sensor member is greater than the zero-degree set point.

Example 15 relates to the system of Example 10, wherein the two or more set point recorded values are determined by measuring signals from the stalk sensor when a jig is held at a known angle within the stalk sensor.

Example 16 relates to the system of Example 10, further comprising a vehicle guidance system wherein the processor is configured to communicate the measured cross track error to the vehicle guidance system and wherein the vehicle guidance system is configured to correct the cross track error.

Example 17 relates to the system of Example 10, wherein the two or more set point recorded values are dependent on a specific gap between stripper plates.

Example 18 relates to the system of Example 10, wherein the stalk sensor is a magnetic, contact stalk sensor.

In Example 19 a method for correcting cross track error of an agricultural vehicle comprising calibrating a stalk sensor with two or more set points, comprising deflecting a left sensor member with a jig at a zero-degree angle and recording the deflection signal value as a first set point for the left sensor member, deflecting a left sensor member with a jig at an angle greater than zero-degrees and recording the deflection signal value as a second set point for the left sensor member, deflecting a right sensor member with a jig at a zero-degree angle and recording the deflection signal value as a first set point for the right sensor member, deflecting a left sensor member with a jig at an angle greater than zero-degrees and recording the deflection signal value as a second set point for the right sensor member, and creating a stalk angle curve for the left sensor member and the right sensor member from the first and second set points of the left sensor member and the right sensor member. The method also comprising measuring a series of sensor deflection signals during operation of the agricultural vehicle, determining a peak sensor deflection signal during a stalk event, determining a stalk angle from the peak sensor deflection signal and the stalk angle curves, comparing the peak sensor deflection signal to the first set point of the left sensor member and the first set point of the right sensor member to detect the presence of cross track error, measuring a magnitude of cross track error by multiplying a header height by Tan (stalk angle), and steering the agricultural vehicle, automatically, to correct the cross track error.

Example 20 relates to the method of Example 19, further comprising filtering and excluding sensor deflection signals not indicative of a stalk event.

While multiple embodiments are disclosed, still other embodiments of the disclosure will become apparent to those skilled in the art from the following detailed description, which shows and describes illustrative embodiments of the invention. As will be realized, the disclosure is capable of modifications in various obvious aspects, all without departing from the spirit and scope of the disclosure. Accordingly, the drawings and detailed description are to be regarded as illustrative in nature and not restrictive.

DETAILED DESCRIPTION

Figure 1:
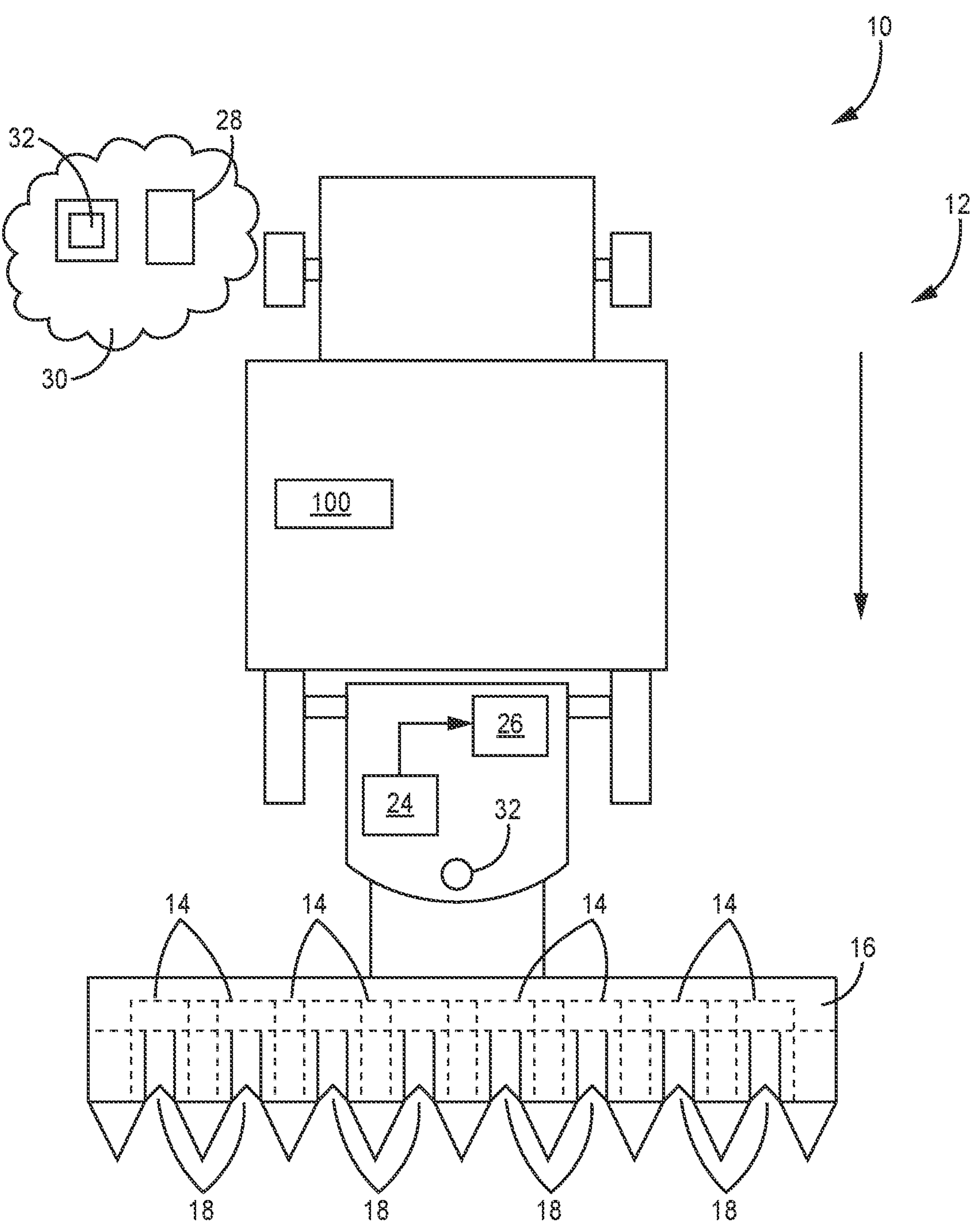
FIG. 1 is a schematic overview of a harvester implementing the system, according to one implementation.

The various devices, systems, and methods described herein relate generally to the use of stalk sensors for calculating and determining cross track error (XTE) therefrom. In various implementations, the system senses stalks and determines a stalk angle relative to the ground which in turn may be used to determined XTE. Once XTE has been determined an automatic or assisted steering system may adjust a harvester heading to eliminate XTE.

Various of the devices and methods herein relate to the devices and methods for elimination/reduction of XTE disclosed in U.S. patent application Ser. No. 16/918,300, which is incorporated by reference herein. Additionally, various stalk sensors may be implemented with the devices, systems, and methods disclosed herein. As has been previously described, stalk sensors can be mounted on a row crop harvester to simultaneously count stalks and determine cross track error (XTE).

The stalk sensors may include, for example, a hall effect magnetic sensor, for detecting and measuring stalks. A hall effect magnetic sensor may be configured to measure the magnetic field strength of a permanent magnet embedded into a resilient mechanical member, as described in U.S. patent application Ser. No. 17/013,037. As stalks push open the sensor member, the embedded magnet moves closer to a rigidly mounted magnetic sensor. The magnetic field increases as the magnet approaches the sensor and decreases as it moves away. The result being a sensor signal that is proportional and repeatable to the deflection distance of each sensor member.

Turning to the figures in more detail, the system 10 may be implemented on a harvester 12. In various implementations, certain components may be present on the harvest 12 while others may be remote from the harvester 12. Various configurations and locations of components would be recognized by those of skill in the art.

The harvester 12 is configured to harvest row crops through row units 14 disposed on a corn head 16. One or more row unit 14 may include a stalk sensor 18. Shown close up in FIG. 2, the stalk sensor 18 includes one or more sensor members/wands 20. In various implementations, the sensor members 20 are located at the gap between the stripper plates 22, such that the sensor member 20 are deflected as stalks enter the stripper plate 22 gap, as had been previously described.

In various implementations, the stalk sensor 18 is in communication with a display 24 and/or other processor 26, such as the InCommand® display from Ag Leader. The system 10 may also optionally include a storage medium 28 to store data. The storage medium 28 may be located on the harvester 12 or may be remote, such as cloud 30 based storage 28. The storage medium 28 may include transitory and/or permanent storage and may include any software, hardware, or firmware components necessary to execute the steps of the methods, as would be understood.

The system 10 may also be in communication with and operate alongside a vehicle guidance system 100. The vehicle guidance system 100 may be or include an automatic or assisted steering system or device, as would be appreciated. Further implementations of the system 10 include a GPS 32 or other geo-location device 32, as would be understood.

Certain of the disclosed implementations can be used in conjunction with any of the devices, systems or methods taught or otherwise disclosed in U.S. Pat. No. 10,684,305 issued Jun. 16, 2020, entitled “Apparatus, Systems and Methods for Cross Track Error Calculation From Active Sensors,” U.S. patent application Ser. No. 16/121,065, filed Sep. 4, 2018, entitled “Planter Down Pressure and Uplift Devices, Systems, and Associated Methods,” U.S. Pat. No. 10,743,460, issued Aug. 18, 2020, entitled “Controlled Air Pulse Metering apparatus for an Agricultural Planter and Related Systems and Methods,” U.S. Pat. No. 11,277,961, issued Mar. 22, 2022, entitled “Seed Spacing Device for an Agricultural Planter and Related Systems and Methods,” U.S. patent application Ser. No. 16/142,522, filed Sep. 26, 2018, entitled “Planter Downforce and Uplift Monitoring and Control Feedback Devices, Systems and Associated Methods,” U.S. Pat. No. 11,064,653, issued Jul. 20, 2021, entitled “Agricultural Systems Having Stalk Sensors and/or Data Visualization Systems and Related Devices and Methods,” U.S. Pat. No. 11,297,768, issued Apr. 12, 2022, entitled “Vision Based Stalk Sensors and Associated Systems and Methods,” U.S. patent application Ser. No. 17/013,037, filed Sep. 4, 2020, entitled “Apparatus, Systems and Methods for Stalk Sensing,” U.S. patent application Ser. No. 17/226,002 filed Apr. 8, 2021, and entitled “Apparatus, Systems and Methods for Stalk Sensing,” U.S. Pat. No. 10,813,281, issued Oct. 27, 2020, entitled “Apparatus, Systems, and Methods for Applying Fluid,” U.S. patent application Ser. No. 16/371,815, filed Apr. 1, 2019, entitled “Devices, Systems, and Methods for Seed Trench Protection," U.S. patent application Ser. No. 16,523,343, filed Jul. 26, 2019, entitled "Closing Wheel Downforce Adjustment Devices, Systems, and Methods," U.S. patent application Ser. No. 16/670,692, filed Oct. 31, 2019, entitled "Soil Sensing Control Devices, Systems, and Associated Methods," U.S. patent application Ser. No. 16/684,877, filed Nov. 15, 2019, entitled "On-The-Go Organic Matter Sensor and Associated Systems and Methods," U.S. Pat. No. 11,523, 554, issued Dec. 13, 2022, entitled "Dual Seed Meter and Related Systems and Methods," U.S. patent application Ser. No. 16/891,812, filed Jun. 3, 2020, entitled "Apparatus, Systems and Methods for Row Cleaner Depth Adjustment On-The-Go," U.S. patent application Ser. No. 16/918,300, filed Jul. 1, 2020, entitled "Apparatus, Systems, and Methods for Eliminating Cross-Track Error," U.S. patent application Ser. No. 16/921,828, filed Jul. 6, 2020, entitled "Apparatus, Systems and Methods for Automatic Steering Guidance and Visualization of Guidance Paths," U.S. patent application Ser. No. 16/939,785, filed Jul. 27, 2020, entitled "Apparatus, Systems and Methods for Automated Navigation of Agricultural Equipment," U.S. patent application Ser. No. 16/997,361, filed Aug. 19, 2020, entitled "Apparatus, Systems and Methods for Steerable Toolbars," U.S. patent application Ser. No. 16/997,040, filed Aug. 19, 2020, entitled "Adjustable Seed Meter and Related Systems and Methods," U.S. patent application Ser. No. 17/011,737, filed Sep. 3, 2020, entitled "Planter Row Unit and Associated Systems and Methods," U.S. patent application Ser. No. 17/060,844, filed Oct. 1, 2020, entitled "Agricultural Vacuum and Electrical Generator Devices, Systems, and Methods," U.S. patent application Ser. No. 17/105,437, filed Nov. 25, 2020, entitled "Devices, Systems and Methods For Seed Trench Monitoring and Closing," U.S. patent application Ser. No. 17/127,812, filed Dec. 18, 2020, entitled "Seed Meter Controller and Associated Devices, Systems and Methods," U.S. patent application Ser. No. 17/132,152, filed Dec. 23, 2020, entitled "Use of Aerial Imagery For Vehicle Path Guidance and Associated Devices, Systems, and Methods," U.S. patent application Ser. No. 17/164,213, filed Feb. 1, 2021, entitled "Row Unit Arm Sensor and Associated Systems and Methods," U.S. patent application Ser. No. 17/170,752, filed Feb. 8, 2021, entitled "Planter Obstruction Monitoring and Associated Devices and Methods," U.S. patent application Ser. No. 17/225,586, filed Apr. 8, 2021, entitled "Devices, Systems, and Methods for Corn Headers," U.S. patent application Ser. No. 17/225,740, filed Apr. 8, 2021, entitled "Devices, Systems, and Methods for Sensing the Cross Sectional Area of Stalks," U.S. patent application Ser. No. 17/323,649, filed May 18, 2021, entitled "Assisted Steering Apparatus and Associated Systems and Methods," U.S. patent application Ser. No. 17/369,876, filed Jul. 7, 2021, entitled "Apparatus, Systems, and Methods for Grain Cart-Grain Truck Alignment and Control Using GNSS and/or Distance Sensors," U.S. patent application Ser. No. 17/381,900, filed Jul. 21, 2021, entitled "Visual Boundary Segmentations and Obstacle Mapping for Agricultural Vehicles," U.S. patent application Ser. No. 17/461,839, filed Aug. 30, 2021, entitled "Automated Agricultural Implement Orientation Adjustment System and Related Devices and Methods," U.S. patent application Ser. No. 17/468,535, filed Sep. 7, 2021, entitled "Apparatus, Systems, and Methods for Row-by-Row Control of a Harvester," U.S. patent application Ser. No. 17/526,947, filed Nov. 15, 2021, entitled "Agricultural High Speed Row Unit," U.S. patent application Ser. No. 17/566,678, filed Dec. 20, 2021, entitled "Devices, Systems, and Method For Seed Delivery Control," U.S. patent application Ser. No. 17/576,463, filed Jan. 14, 2022, entitled "Apparatus, Systems, and Methods for Row Crop Headers," U.S. patent application Ser. No. 17/724,120, filed Apr. 19, 2022, entitled "Automatic Steering Systems and Methods," U.S. patent application Ser. No. 17/742,373, filed May 11, 2022, entitled "Calibration Adjustment for Automatic Steering Systems," U.S. patent application Ser. No. 17/902,366, filed Sep. 2, 2022, entitled "Tile Installation System with Force Sensor and Related Devices and Methods," U.S. patent application Ser. No. 17/939,779, filed Sep. 7, 2022, entitled "Row-by-Row Estimation System and Related Devices and Methods," U.S. patent application Ser. No. 18/081,432, filed Dec. 14, 2022, entitled "Seed Tube Guard and Associated Systems and Methods of Use," U.S. patent application Ser. No. 18/087, 413, filed Dec. 22, 2022, entitled "Data Visualization and Analysis for Harvest Stand Counter and Related Systems and Methods," U.S. patent application Ser. No. 18/097,801, filed Jan. 17, 2023, entitled "Agricultural Mapping and Related Systems and Methods," U.S. patent application Ser. No. 18/101,394, filed Jan. 25, 2023, entitled "Seed Meter with Integral Mounting Method for Row Crop Planter and Associated Systems and Methods," U.S. patent application Ser. No. 18/102,022, filed Jan. 26, 2023, entitled "Load Cell Backing Plate and Associated Devices, Systems, and Methods," U.S. Patent Application 63/346,665, filed May 27, 2022, entitled "Seed Delivery Tube Camera for Furrow Monitoring," U.S. Patent Application 63/351,602, filed Jun. 13, 2022, entitled "Apparatus, Systems and Methods for Image Plant Counting," U.S. Patent Application 63/357,082, filed Jun. 30, 2022, entitled "Seed Tube Guard," U.S. Patent Application 63/357,284, filed Jun. 30, 2022, entitled "Grain Cart Bin Level Sharing," U.S. Patent Application 63/394, 843, filed Aug. 3, 2022, entitled "Hydraulic Cylinder Position Control for Lifting and Lowering Towed Implements," U.S. Patent Application 63/395,061, filed Aug. 4, 2022, entitled "Seed Placement in Furrow," U.S. Patent Application 63/400,943, filed Aug. 25, 2022, entitled "Combine Yield Monitor," U.S. Patent Application 63/406,151, filed Sep. 13, 2022, entitled "Hopper Lid with Magnet Retention and Related Systems and Methods," U.S. Patent Application 63/427,028, filed Nov. 21, 2022, entitled "Stalk Sensors and Associated Devices, Systems and Methods," U.S. Patent Application 63/445,960, filed Feb. 15, 2023, entitled "Ear Shelling Detection and Related Devices, Systems, and Methods," and U.S. Patent Application 63/445,550, filed Feb. 14, 2023, entitled "Liquid Flow Meter and Flow Balancer," each of which is incorporated herein by reference.

Figure 3:
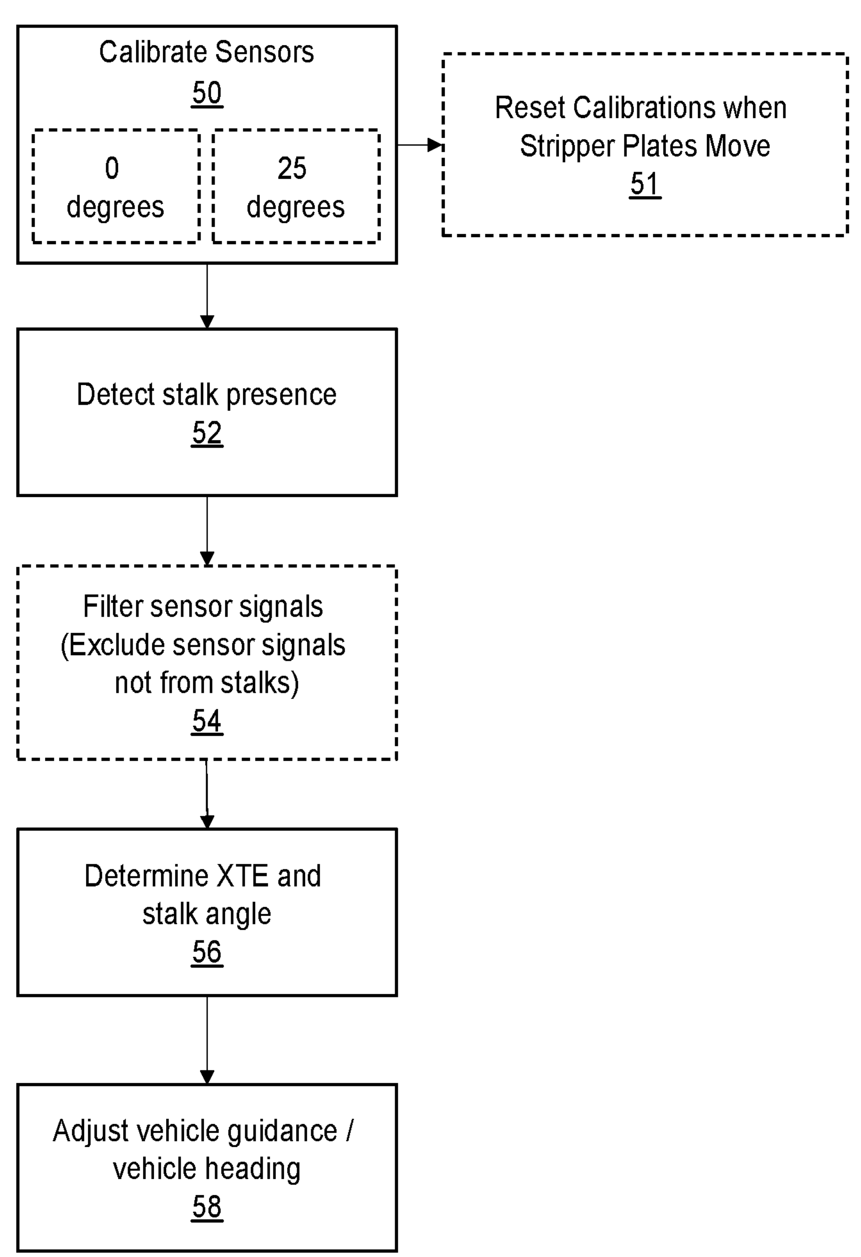
FIG. 3 is a flow diagram of the system, according to one implementation.

The devices, systems, and methods disclosed herein calculate XTE by measuring the stalk angle as stalks pass through the stalk sensor 18, including left sensor member 20A and right sensor member 20B. Turning to FIG. 3, generally, the system 10 is configured execute a series of steps, each of which is optional and may be performed in any order or not at all. Various steps may be performed intermittently, iteratively, and/or at any time. In one step, the system 10 calibrates the stalk sensors 18 and sensor members 20A, 20B (box 50). In another optional step, the system 10 may then detect the presence of stalks (box 52). Optionally, the system 10 may be configured to filter and/or exclude certain sensor signals from the data set (box 54). In a further optional step, the system 10 determines XTE and stalk angle form the sensor signals (box 56). In another optional step, the system 10 may command or be in communication with an automatic/assisted steering system 100 to adjust harvester 12 heading.

The devices, system, and methods disclosed herein may be implemented with any stalk sensor 18 that can measure stalk angle. Exemplary stalk sensors 18 include, but are not limited to, magnetic resistive sensors, mechanical strain sensors, ultrasonic sensors, and light-based sensors.

Stalk Sensor Calibration (box 50)

As has been previously described, stalk sensors 18 may be calibrated to have a set point or threshold deflection that marks when the sensor member has deflected to a point even with the edge of the stripper plate 22. That is, if the threshold deflection is exceeded the sensor member 20A, 20B has deflected past the edge of the stripper plate 22.

Figure 4:
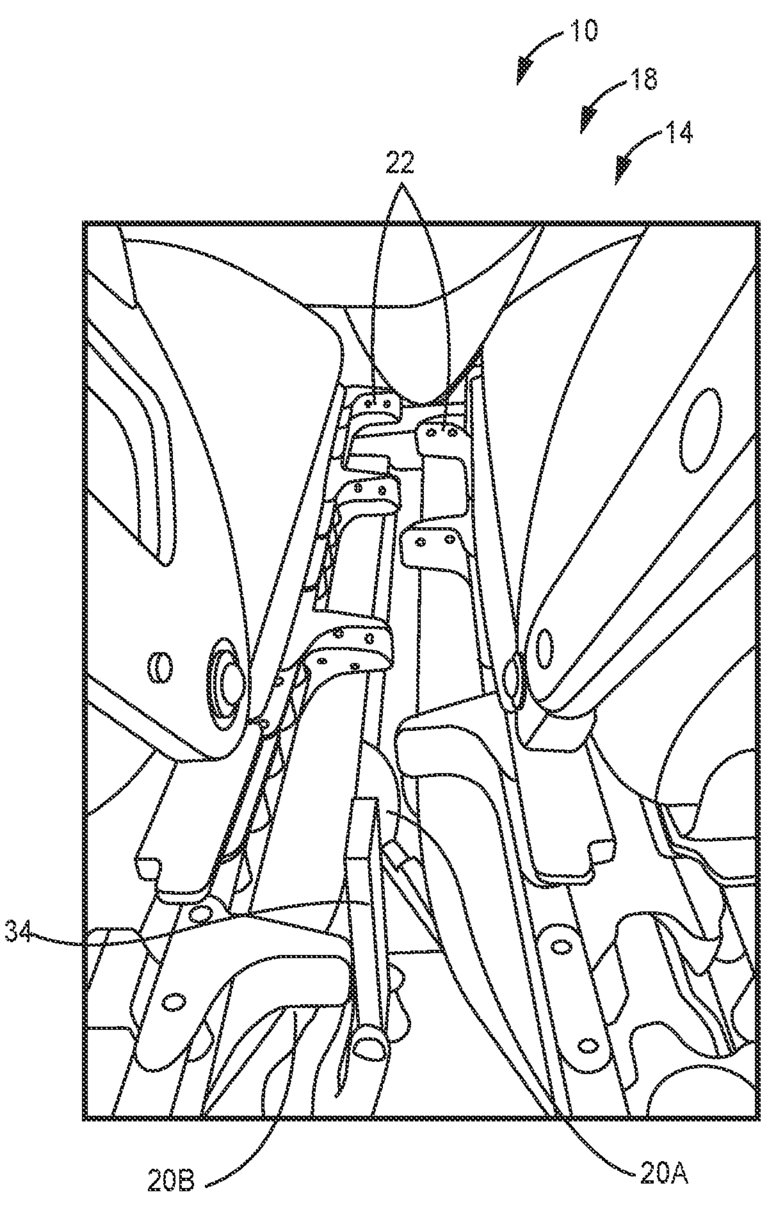
FIG. 4 is a top, perspective view of jig calibration of a stalk sensor, according to one implementation.
Figure 5:
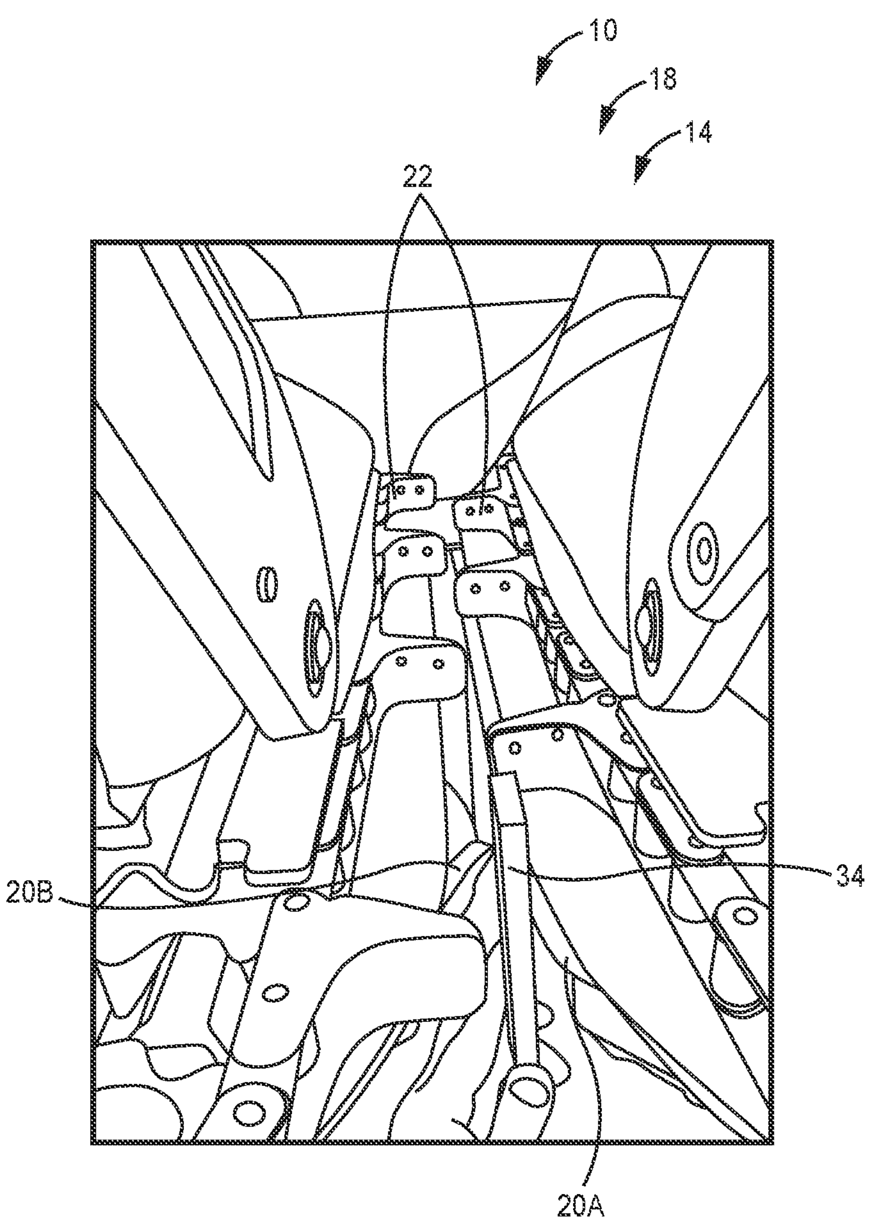
FIG. 5 is a top, perspective view of a jig calibration of a stalk sensor, according to one implementation.

Turning to FIGS. 4 and 5, left and right sensor member 20A, 20B set point calibrations can be determined such as by using a jig 34 to hold deflect each sensor member 20A, 20B back to the point where it is even with the edge of the stripper plate 22. The set point(s) can be used to calculate sensor readings and convert those readings into stalk angles. In the example of FIGS. 4 and 5, the jig 34 is held perpendicular to the ground while deflecting the sensor members 20A, 20B. In these and other implementations, the set points are recorded in the memory or storage device 28 either local to the harvester 12 such as a storage medium 28 integrated with the display 24, or alternative may be stored in cloud 30 based storage.

In various implementations, the left and right sensor members 20A, 20B each require at least two set point calibrations. As would be appreciated more than two set point calibrations may be performed and recorded. For example, more than two set points may be necessary for non-linear sensors 18. In experimental data, magnetic sensors 18 have shown a near linear output between a zero degree and twenty-five-degree stalk angles. The subsequent examples use these two set point calibration values, but alternative calibration values are possible and would be understood by those of skill in the art.

FIGS. 4 and 5 are examples of a zero-degree, with respect to vertical, calibration/set point determination. A vertical jig 34 deflects the sensor member 20A, 20B when the jig 34 is held against the edge of each stripper plate 22. The system 10 records a zero-degree sensor reading while the jig 34 is held in place.

Figure 6:
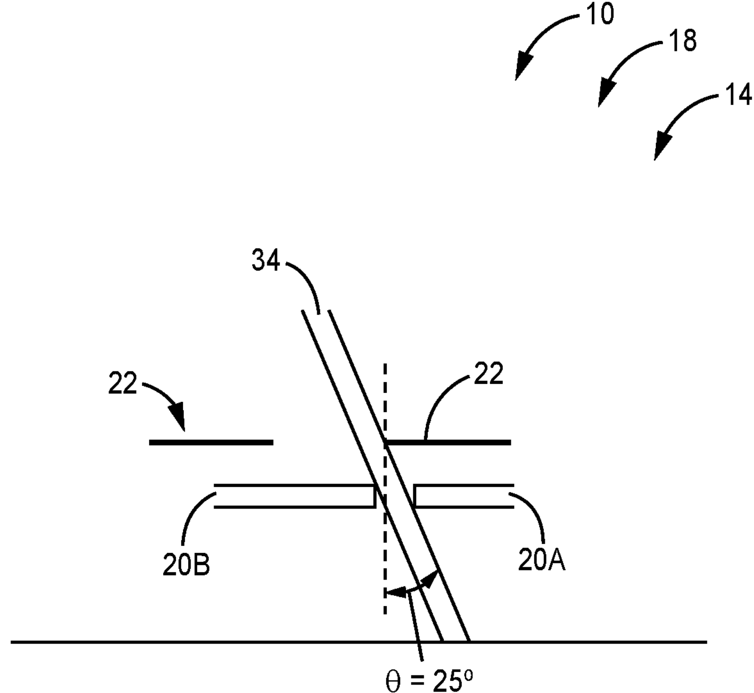
FIG. 6 is a front view of a stalk sensor during jig calibration, according to one implementation.
Figure 7:
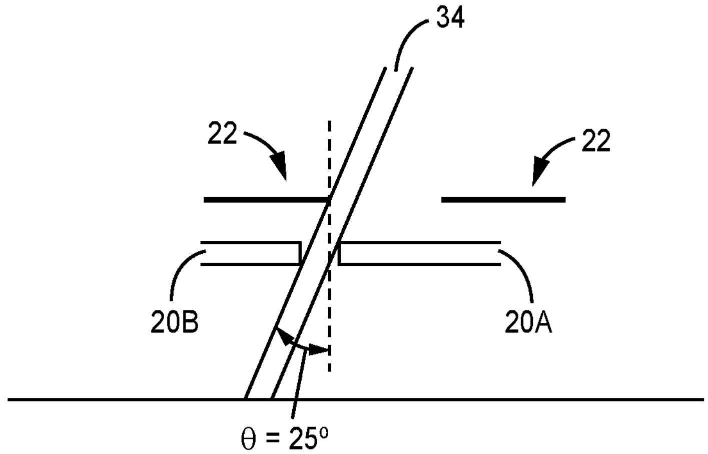
FIG. 7 is a front view of a stalk sensor during jig calibration, according to one implementation.

Similarly, a twenty-five-degree, with respect to vertical, jig 34 deflects the sensor member 20A, 20B as the jig 34 is held against the edge of each stripper plate 22 and is at a twenty-five degree angle with respect to the ground, as shown for example in FIGS. 6 and 7. The jig 34 creates the twenty-five-degree theta (θ) angle relative to the ground. The system 10 records a twenty-five-degree sensor reading while the jig 34 is held in place. Example calibration numbers are shown in Table 1 below. Of course alternative calibration numbers and angles are possible and would be appreciated by those of skill in the art.

TABLE 1

| Jig Stalk Angle (degrees) | Left Sensor (20A) Reading | Right Sensor (20B) Reading |
|---|---|---|
| 0 | 185 | 226 |
| 25 | 260 | 310 |

Figure 8:
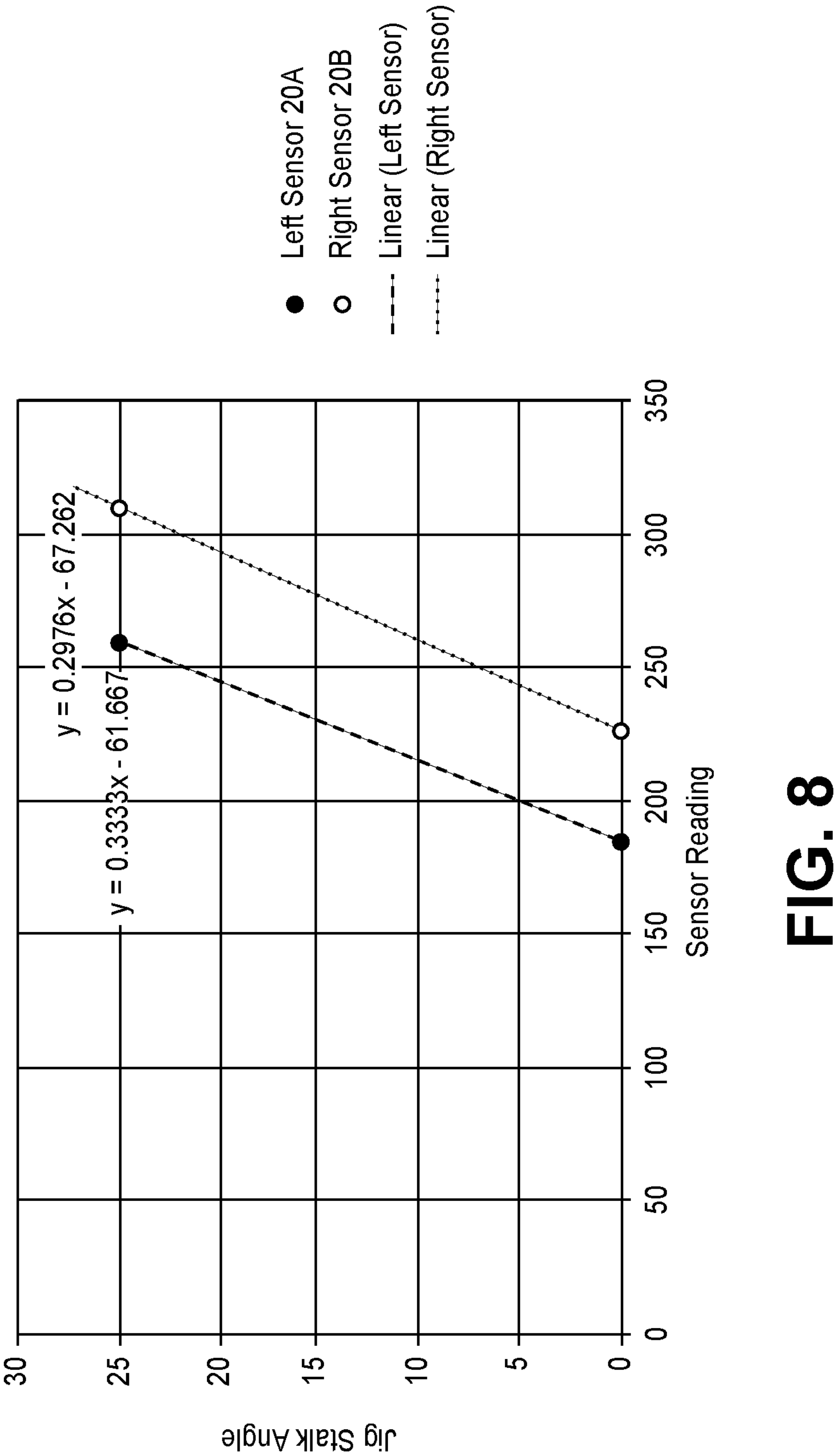
FIG. 8 is an exemplary stalk angle curve for a stalk sensor, according to one implementation.

In various implementations, the set points (for example the zero- and twenty-five-degree set points) are used to create a linear curve/calibration for each sensor member 20A, 20B, shown for example in FIG. 8. A unique calibration curve is generated for each sensor 18 and sensor member 20A, 20B. As would be understood sensor 18 installation and inherent differences in the sensors 18/sensor member 20A, 20B themselves can be a cause for difference between individual components such that individual calibration is necessary.

Stalk angle calibration values are unique to the left/right position of the stripper plates 22 relative to the sensor members 20A, 20B. As would be understood, stripper plates 22 can be adjusted left or right to provide a wider or narrower stripper plate gap. As would be appreciated, the harvester operator can adjust stripper plates 22 on-the-go on many modern corn heads 16. Adjustment on older corn heads 16 often requires wrenches and the harvester 12 to be shutoff. Further, most modern corn heads 16 are configured to move only one side of the stripper plates 22, while the other side stripper plate 22 is fixed. The adjustable stripper plates 22 are usually mechanically linked together so that one actuator moves all rows at the same time to the same width.

In various implementations, the set points/calibrations are reset for each time a stripper plate moves (box 51 of FIG. 3). As would be appreciated, in certain situations, such as when the stripper plates 22 move a small amount, the system 10 may perform with enough accuracy to not require the set points/calibrations to be reset despite movement of the stripper plates 22. Yet, it would also be understood that accuracy and precision of the system 10 is increased when the set points/calibrations are changed along with the stripper plate 22 positions.

As an example, the XTE error is about 2 inches for every 3/16 inch the stripper plate 22 moves from its calibrated location. Harvester 12 steering systems 100 may become too slow or too fast to respond when XTE error is 2+ inches.

Figure 9:
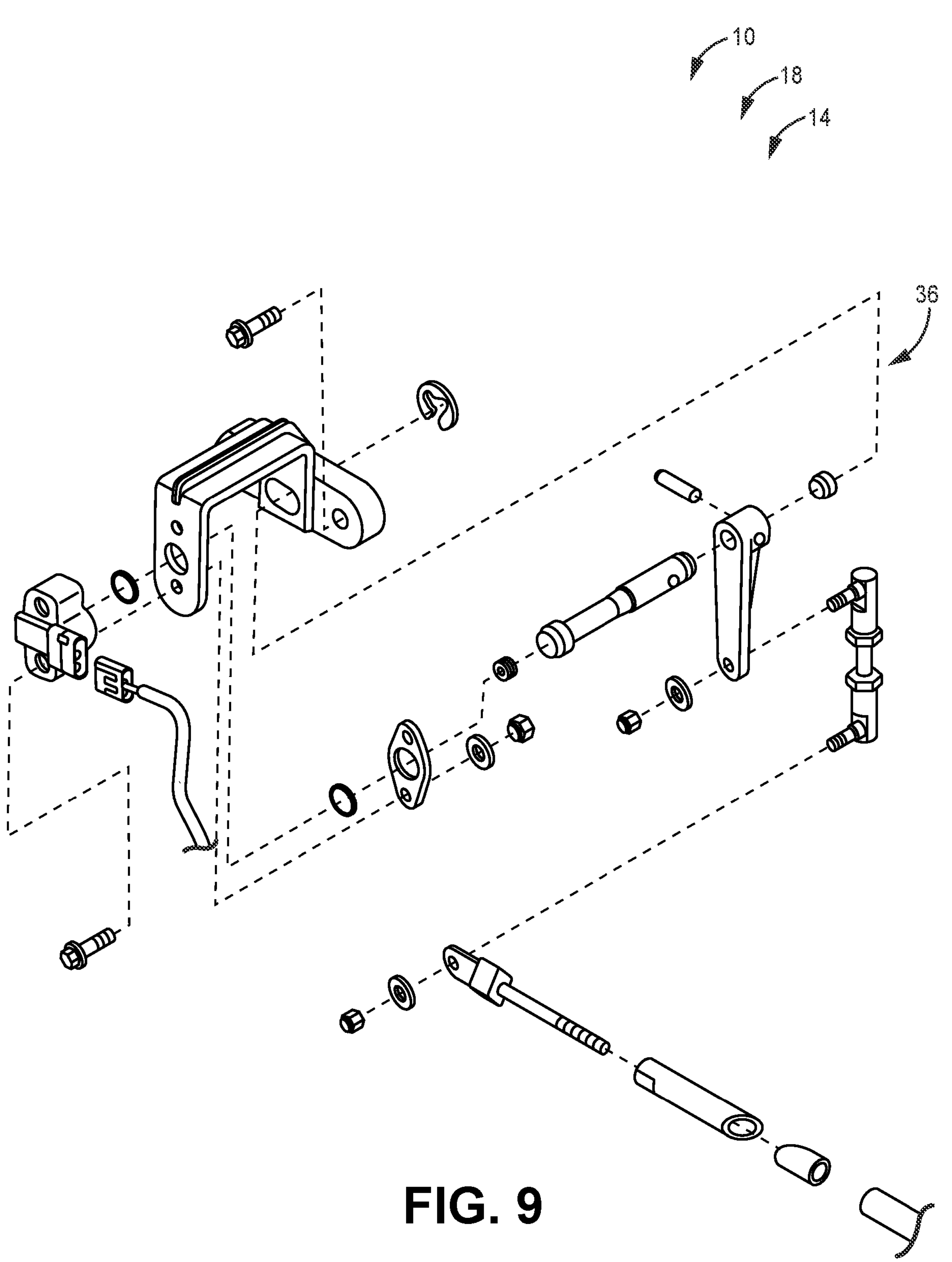
FIG. 9 is an exploded view of a stripper plate spacing sensor, according to one implementation.

It is burdensome for the harvester operator that frequently adjusts stripper plates 22 to stop after each adjustment and redo the jig 34 calibration, described above. Therefore, the system 10 may employ a stripper plate 22 spacing sensor 36 (shown for example in FIG. 9) to automatically adjust the jig 34 calibration numbers as the stripper plates 22 are adjusted. In various implementations, the spacing sensor 36 measures the distance the stripper plate 22 moves left and right and based on prior jig 34 calibrations and sensor 18 characteristics, the system 10 automatically calculates new jig 34 calibrations in proportion to the stripper plate 22 sensor 36 signal change.

Stalk Angle Calculation (boxes 52-56)

In various implementations, the system 10 excludes and or filters sensor 18 signals (box 54). For example sensor 18 signals not indicative of stalk presence may be excluded from the time series of stalk sensor 18 signals.

Figure 10:
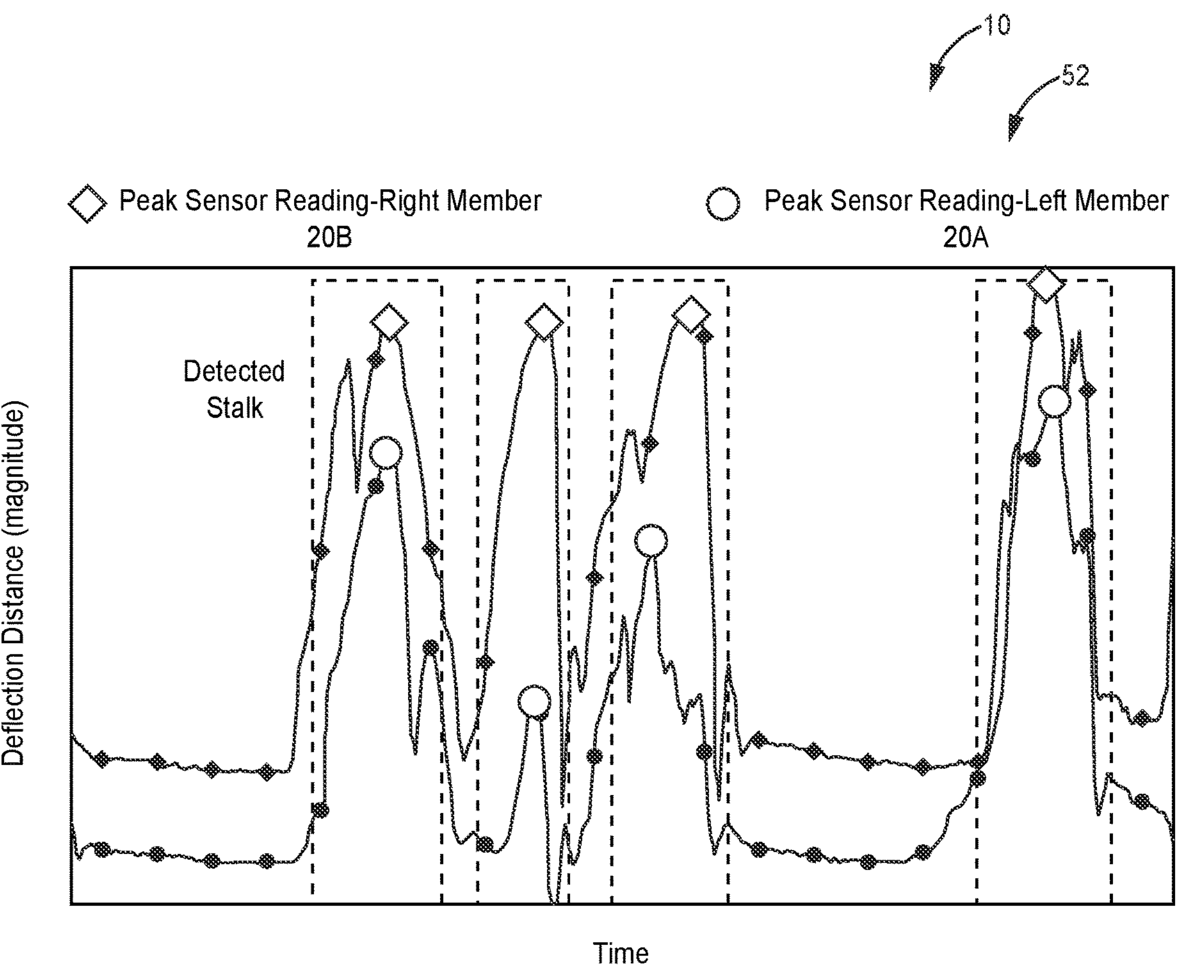
FIG. 10 is an exemplary graphical view of a time-series of stalk sensor signals, according to one implementation.

In one specific example the system 10 excludes sensor signals 18 between stalks in order to calculate stalk angle accurately. For example, sometimes weeds and/or corn stalk leaves can appear between stalks, moving the sensor members 20A, 20B, and thereby creating noise that should be eliminated prior to analysis/executing further steps of the method. In various implementations, a stalk detection algorithm is employed to determine a "stalk pulse" or signal indicative of a stalk passing through the sensor (box 52), as shown in FIG. 10. In these implementations, within each stalk pulse, a left and right peak sensor reading is measured.

As would be understood, corn stalks are elliptical, and therefore will continue to push or deflect the sensor member 20A, 20B open until the sensor member 20A, 20B has reached the round extent of the stalk. This spot corresponds to the peak reading within the stalk pulse. Various alternative measures that are proportional to peak value may be employed instead of peak value, in alternative implementations. For example, when analyzing the population of all deflection data collected during a detected stalk event—the stalk pulse—Root Mean Square (RMS) or the 3rd quartile value could be used (box 52).

Additionally, in some implementations the time-series of stalk sensor 18 deflection data could be filtered before identifying a peak value (box 54). Such methods include low pass, band pass, FIR, and IIR recursive filters, among others that would be known and appreciated by those of skill in the art. Data outlier rejection techniques such as local outlier factor, Z-score, isolation forest, autoencoders, or other methods may be used before selecting a peak value in order to reduce noise (box 54).

Figure 11:
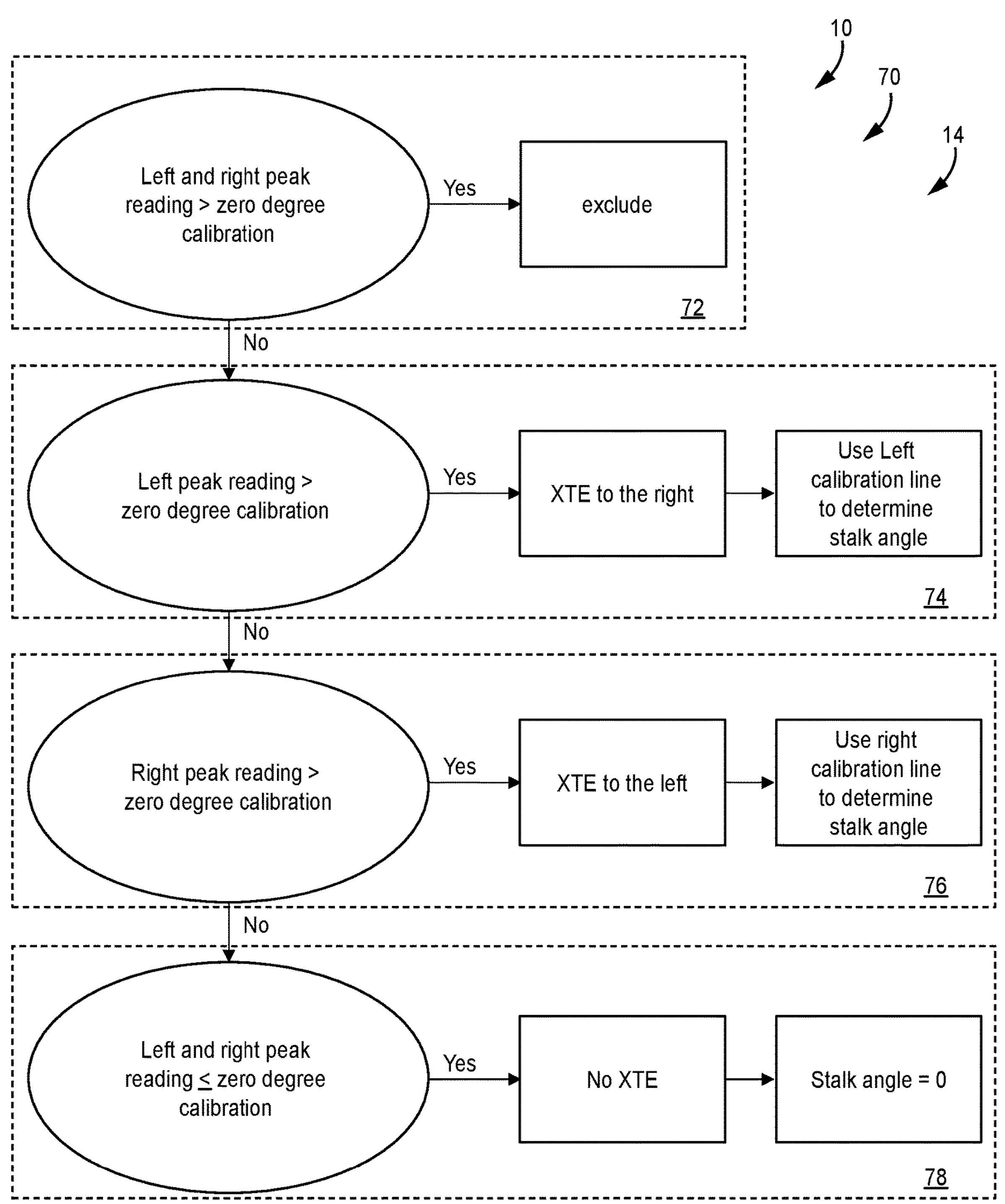
FIG. 11 is a flow diagram of exemplary logic for determining cross track error, according to one implementation.

In various implementations, the system 10 uses logic 70 to calculate stalk angle from peak sensor readings. An exemplary logic path 70 is outlined below and is shown in FIG. 11. Various alternative algorithms and/or logic trees may be used and would be appreciated from this disclosure. In various implementations, the logic 70 is executed by the processor 26 or any other appropriate hardware, software, and/or firmware as would be appreciated.

In one optional step, if the left and right sensor peak reading are both greater than their respective zero-degree jig calibration numbers, the signal is ignored/skipped/excluded (box 72). This signal may optionally be excluded because it is likely that a large clump of crop material or an ear is passing through the sensor member 20A, 20B rather than a stalk. Because it is not a stalk passing through the sensor 18 a stalk angle reading derived from that signal would be incorrect.

Example

Left Sensor (20A) Peak Reading=203
Right Sensor (20B) Peak Reading=274
Left zero-degree jig calibration=185
Right zero-degree jig calibration=260
203 is greater than 185 and 274 is greater than 260; therefore, the peak/signal is ignored.

In a further optional step, if the left sensor 20A peak reading is greater than the left zero-degree jig calibration number, the system 10 recognizes the harvester 12 is steering off to the right of the row (right XTE) (box 74). In this condition the system 10 is configured to use the left sensor calibration line to calculate stalk angle.

Example

Left Sensor (20A) Peak Reading=234
Right Sensor (20B) Peak Reading=218
Left zero-degree jig calibration=185
Right zero-degree jig calibration=260
Left Sensor Calibration Line=Stalk Angle=0.3333 (Left Sensor Peak Reading)−61.667. y=0.3333x−61.667 (see FIG. 2)
Stalk angle=16.3 degrees=0.3333(234)−61.667

In a still further optional step, if the right sensor 20B peak reading is greater than the right zero-degree jig calibration number, the system 10 recognizes the harvester 12 is steering off to the left of the row (box 76). In this condition, the system 10 is configured to use the right sensor calibration line to calculate stalk angle.

Example

Figure 2:
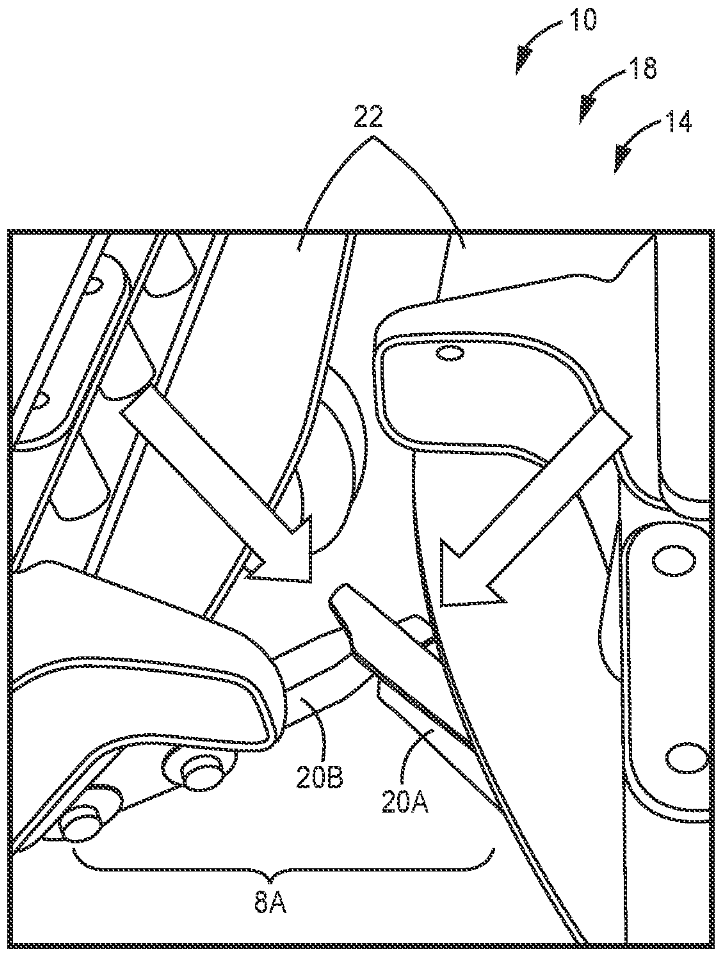
FIG. 2 is a perspective view of a stalk sensor disposed on a row unit, according to one implementation.

Left Sensor Peak Reading=160
Right Sensor Peak Reading=304
Left zero-degree jig calibration=185
Right zero-degree jig calibration=260
Right Sensor Calibration Line=Stalk Angle=0.2976 (Right Sensor Peak Reading)−67.262. y=0.2976x−67.262 (see FIG. 2.)
Stalk angle=23.2 degrees=0.2976(304)−67.262

If a still further optional step, if the left 20A and right 20B sensor peak readings are both be equal to or less than their zero-degree jig calibration numbers, the system 10 recognizes the stalks as entering vertically through the stripper plate 22 gap, which indicates the harvester 12 is aligned with the row (no XTE) and the stalk angle is set to zero (box 78).

By the use of the peak reading to determine if there is XTE and the stalk angle, the determination is not influenced by stalk size, travel speed, or plant population.

XTE Calculation (box 56)

Figure 12:
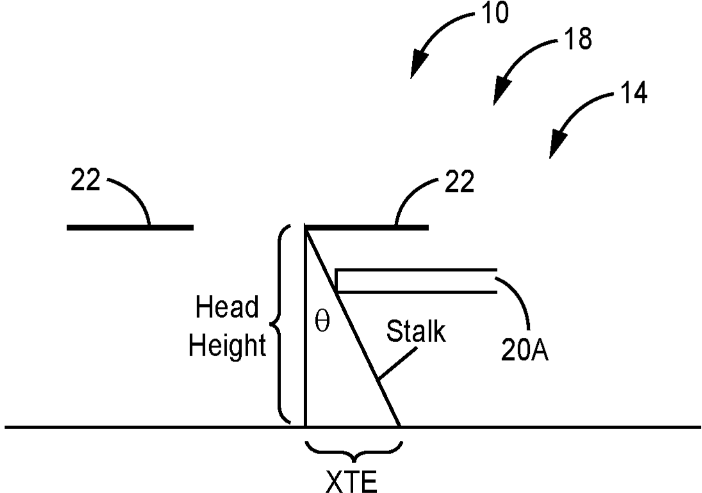
FIG. 12 is a front view a stalk sensor measuring cross track error, according to one implementation.

In various implementations, the system 10 uses the geometry illustrated in FIG. 12 to calculate XTE from the stalk angle. In FIG. 12 the stalk angle is theta (θ) and XTE is calculated according to the following formula:

$$\text{Header Height}*\tan\theta=\text{XTE}$$

As would be appreciated, various prior known XTE measuring systems indicate left and right by negative and positive values—a left XTE is negative and a right XTE is positive. For example, four inches off to the left of the row is shown as [−4] XTE and four inches off to the right is [4] XTE. The current system determines XTE direction (left or right) as described in the steps above—by comparing sensor 18 signals to set points.

Right XTE Example
Head Height=12 inches
Stalk Angle=16.3
XTE sign=[+]
12*Tan(16.3)=3.5
XTE=[3.5] inches Left XTE Example
Head Height=12 inches
Stalk Angle=23.2
XTE sign=[−]
12*Tan(23.2)=5.1
XTE=[−5.1] inches As would be appreciated and as has been previously described, header 12 height can be changed manually or automatically on-the-go. Various automatic systems can maintain a header 12 height set by the harvester operator; however, the operator may change target height to accommodate changes in stalk conditions, such as lodged stalks. Further, steering systems 100 may perform adequately if the actual head height stays within ±2-3 inches of the XTE system setting. A difference greater than ±2-3 inches from the XTE system setting can create a high XTE error that may degrade steering performance. Because of this, the system 10 may employ a header height sensor (in lieu of or in addition to a user setting), such as is described in U.S. patent application Ser. No. 17/576,463, which has been incorporated herein by reference.

Heading Error Calculation and Correction (box 58)

In various implementations, the system 10 may be configured to communicate with a vehicle guidance system 100. As would be understood, vehicle guidance systems 100 may realize a performance benefit from receiving information on the deviation between the actual vehicle heading and the desired path heading, herein referred to as heading error. In various implementations, heading error may be provided in addition to XTE but is not a requirement for vehicle guidance. During harvest the exact, ideal path of the combine is unknown which complicates calculating a heading error.

In certain implementations, the vehicle guidance system 100 can estimate the current path by shifting the path traveled during the harvester's 12 previous path by the swath width of the working head. In many cases this will provide a good estimate of the path, though path features unique to the current path, such as obstacles or hazards, will not be reflected in the estimate. Various vehicle guidance methods have been previously described and certain of those are disclosed in U.S. patent application Ser. No. 16/939,785, which has been incorporated herein by reference.

In alternative implementations, the current path may be estimated from the path travelled by the planting implement or tractor attached to the planting implement when it planted the crop now being harvested. If the planter and combine do not use the same swath or working width, a new harvest path may be generated based on the neighboring planting paths.

Figure 13:
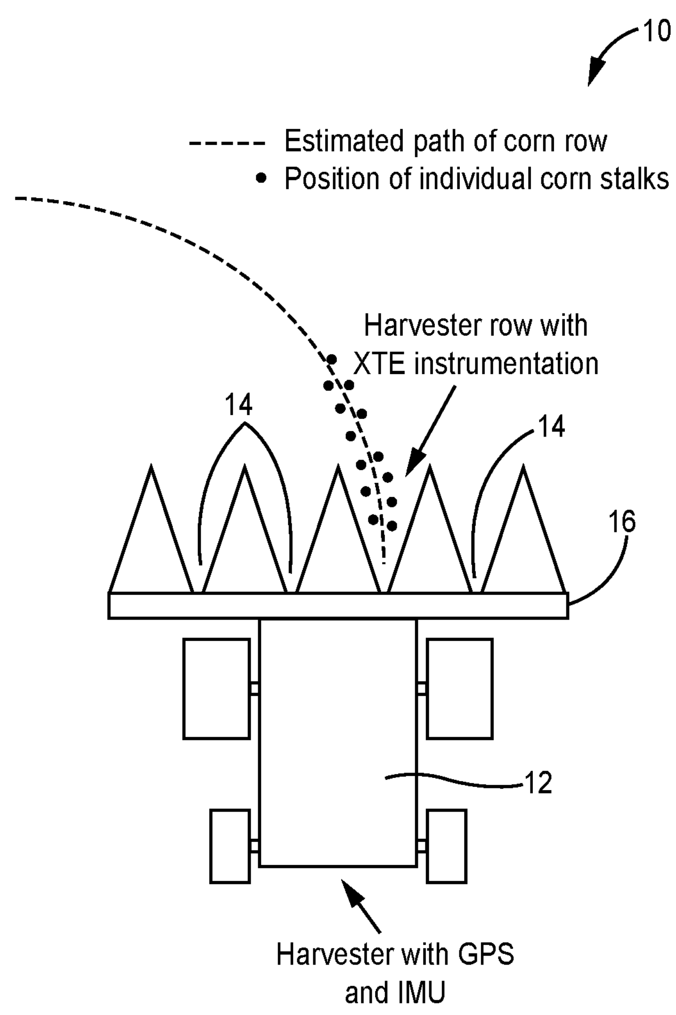
FIG. 13 is a top view of a harvester and exemplary mapping of a heading, according to one implementation.
Figure 14:
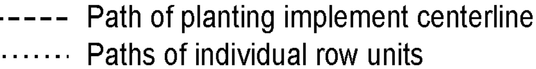
FIG. 14 is a top view of a planting implement and exemplary path, according to one implementation.
Figure 14:
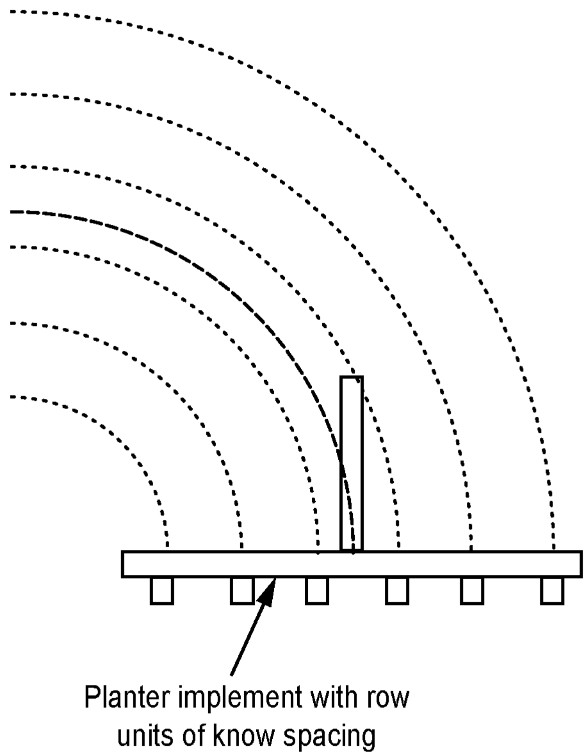

In a further alternative implementation, the current path may be estimated by fitting a line, spline, arc, circle, polynomial curve of any order, conic section, or other geometric path to the recently reported absolute ground positions of plant stalks in each row. With an absolute harvester 12 position and heading established by the GPS 32 and IMU of the guidance system 100 and the position relative to the harvester 12 of a plant stalk from the XTE measurement method described above, it is possible to calculate the absolute ground position of the measured stalk. The path fitting may be done using a variety of methods, including least squares fit, hyper circle fitter, or others as shown in FIG. 13. It should be noted that when a towed or mounted rigid-toolbar planter navigates a turn, the planter inscribes a family of arcs, with each row unit following its own unique radius, as shown in FIG. 14. Therefore, the estimated path for each measured row may be calculated individually then evaluated as a group to determine the harvester 12 path.

Figure 15:
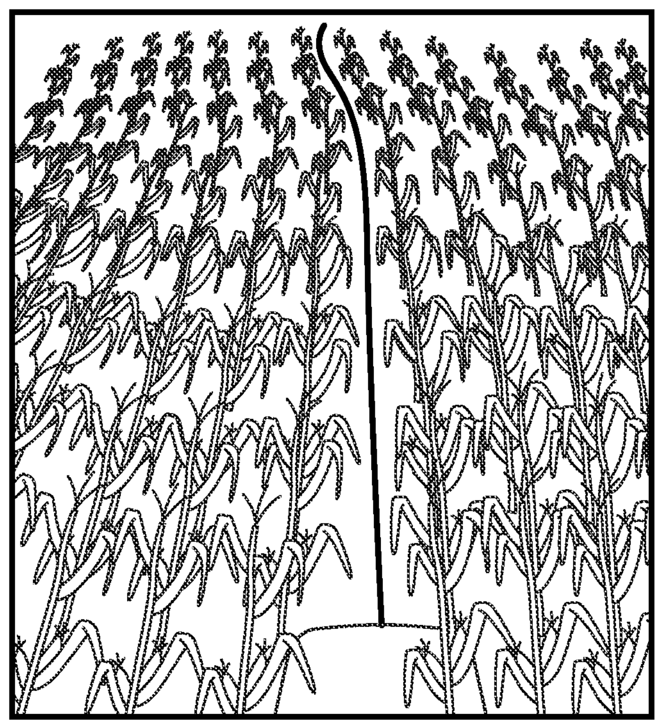
FIG. 15 is a forward view from a forward-facing visual sensor determining a harvester heading, according to one implementation.

The heading error may be estimated by using non-contact sensing of crop rows ahead of the harvester. Sensing could be performed using video cameras, Lidar, stereo video, radar, or other methods as shown for example in FIG. 15.

Contact XTE measurements, as described herein, can provide a more precise indication of XTE when operating in fully grown corn that is ready to harvest. Optionally, in combination with the various heading error measurements/algorithms, the XTE measurements can be used to correct harvester heading and direct an automatic steering system 100 to eliminate/reduce XTE and thereby maximize yield.

In certain implementations, the system 10 utilizes artificial intelligence to dynamically update the defined thresholds/set points and other established processes described herein. Machine learning algorithms are trained on historical data to analyze patterns and identify correlations between input parameters and system performance. These algorithms are then used to continuously monitor the system and make adjustments to the various thresholds and parameters in real-time. Certain implementations utilize a combination of rule-based and machine learning approaches, where a set of predefined rules are used to adjust the thresholds in specific situations, while machine learning algorithms are used to optimize the thresholds in other scenarios. Additionally, the system can also be configured to receive feedback from users and use this feedback to make further adjustments to the thresholds. This allows for a more adaptive and responsive system that can continuously improve its performance over time.

Although the disclosure has been described with references to various embodiments, persons skilled in the art will recognized that changes may be made in form and detail without departing from the spirit and scope of this disclosure.

What is claimed is:

1. A method for determining cross track error, comprising:

calibrating a stalk sensor with two or more set points, the stalk sensor comprising one or more wands located at a gap between a set of stripper plates such that the one or more wands are deflected as stalks enter the gap between the set of stripper plates;

detecting plant stalks by deflection of the one or more wands of the stalk sensor;

measuring a stalk angle for each plant stalk using peak readings from the stalk sensor; and measuring presence and amount of cross track error based on the measured stalk angle.

2. The method of claim 1, further comprising instructing a vehicle guidance system to correct measured cross track error.

3. The method of claim 1, further comprising filtering signals from the stalk sensor to exclude signals not from plant stalks.

4. The method of claim 1, further comprising resetting calibration values for the two or more set point when the stripper plates move.

5. The method of claim 1, wherein the two or more set points comprise a zero-degree set point and a twenty-five degree set point.

6. The method of claim 5, wherein when a sensor signal from a left wand is greater than the zero-degree set point cross track error to the right is measured.

7. The method of claim 5, wherein when a sensor signal from a right wand is greater than the zero-degree set point cross track error to the left is measured.

8. The method of claim 5, wherein when a sensor signal from a left wand and a right wand are less than the zero-degree set point for the left wand and the right wand no cross track error is indicated.

9. The method of claim 1, wherein the amount of cross track error is equal to corn head height multiplied by Tan (stalk angle).

10. The method of claim 1, wherein calibrating the stalk sensor comprises:

deflecting a first of the one or more wands to a first set point and recording a sensor reading;

deflecting the first of the one or more wands to a second set point and recording the sensor reading; and generating a calibration curve for the first of the one or more wands.

11. The method of claim 10, wherein calibrating the stalk sensor further comprises:

deflecting a second of the one or more wands to a first set point and recording a sensor reading;

deflecting the second of the one or more wands to a second set point and recording the sensor reading; and generating a calibration curve for the second of the one or more wands.

12. The method of claim 10, wherein the first set point is a 0-degree set point and the second set point is a twenty-five degree set point.

13. A method for determining cross track error, comprising:

calibrating a stalk sensor with two or more set points, the stalk sensor comprising a first wand and a second wand located at a gap between a set of stripper plates, wherein the calibrating comprises;

deflecting the first and second wands to a first set point and recording sensor readings;

deflecting the first and second wands to a second set point and recording the sensor reading; and generating a calibration curve for the first of the one or more wands;

detecting plant stalks by deflection of the one or more wands of the stalk sensor;

measuring a stalk angle for each plant stalk using peak readings from the first and second wands and the calibration curve; and measuring presence and amount of cross track error based on the measured stalk angle.

14. The method of claim 13, further comprising instructing a vehicle guidance system to correct cross track error.

15. The method of claim 13, wherein cross track error is equal to corn head height multiplied by the measured stalk angle (Tan).

16. The method of claim 13, further comprising filtering signals from the stalk sensor to exclude signals not from stalks.

17. The method of claim 13, wherein the first set point is a 0-degree set point and the second set point is a twenty-five degree set point.

18. The method of claim 17, wherein when a sensor signal from a left wand is greater than the zero-degree set point cross track error to the right is measured.

19. The method of claim 17, wherein when a sensor signal from a right wand is greater than the zero-degree set point cross track error to the left is measured.

20. The method of claim 17, wherein when a sensor signal from a left wand and a right wand are less than the zero-degree set point for the left wand and the right wand no cross track error is indicated.

* * * * *